(12) United States Patent
Ogino et al.

(10) Patent No.: US 10,814,713 B2
(45) Date of Patent: Oct. 27, 2020

(54) TRANSAXLE DEVICE

(71) Applicant: MITSUBISHI JIDOSHA KOGYO KABUSHIKI KAISHA, Tokyo (JP)

(72) Inventors: Daizo Ogino, Tokyo (JP); Masahiro Matsushita, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/302,257

(22) PCT Filed: Mar. 27, 2017

(86) PCT No.: PCT/JP2017/012271
§ 371 (c)(1),
(2) Date: Nov. 16, 2018

(87) PCT Pub. No.: WO2017/217064
PCT Pub. Date: Dec. 21, 2017

(65) Prior Publication Data
US 2019/0291563 A1    Sep. 26, 2019

(30) Foreign Application Priority Data

Jun. 13, 2016 (JP) .................. 2016-117005

(51) Int. Cl.
*B60K 17/04*    (2006.01)
*B60K 6/365*    (2007.10)
(Continued)

(52) U.S. Cl.
CPC .............. *B60K 6/365* (2013.01); *B60K 6/387* (2013.01); *B60K 6/40* (2013.01); *B60K 6/442* (2013.01);
(Continued)

(58) Field of Classification Search
CPC ........ B60K 6/365; B60K 6/387; B60K 17/04; B60K 6/547; B60K 6/442;
(Continued)

(56) References Cited

U.S. PATENT DOCUMENTS 5,856,709 A    1/1999    Ibaraki et al.
5,875,691 A    3/1999    Hata et al.
(Continued)

FOREIGN PATENT DOCUMENTS

CN    107089130 A  *  8/2017
CN    109278528 A  *  1/2019
(Continued)

OTHER PUBLICATIONS

International Preliminary Report on Patentability and the English translation of the Written Opinion of the International Searching Authority (Forms PCT/IB/373 and PCT/ISA/237), dated Dec. 18, 2018, for International Application No. PCT/JP2017/012271.
(Continued)

*Primary Examiner* — Roger L Pang
(74) *Attorney, Agent, or Firm* — Birch, Stewart, Kolasch & Birch, LLP

(57) ABSTRACT

A transaxle device (1) for a hybrid vehicle including an engine (2), a first rotating electric machine (3), and a second rotating electric machine (4) individually transmit the power of the engine (2) and power of the first rotating electric machine (3) to an output shaft (12) on a drive wheel side and also transmits the power of the engine (2) to the second rotating electric machine (4). Further, the transaxle device (1) includes an input shaft (11) which is coaxially connected to a rotating shaft (2a) of the engine (2) and a switching mechanism (20A) which is interposed in at least the input shaft (11) and switches a high gear stage (11H, 15H) and a low gear stage (11L, 15L).

6 Claims, 11 Drawing Sheets

(51) Int. Cl.

| | |
|---|---|
| *B60K 6/442* | (2007.10) |
| *B60K 6/547* | (2007.10) |
| *F16H 3/091* | (2006.01) |
| *F16H 3/54* | (2006.01) |
| *F16H 37/08* | (2006.01) |
| *B60K 6/387* | (2007.10) |
| *B60K 6/40* | (2007.10) |
| *F16H 3/62* | (2006.01) |
| *F16H 3/72* | (2006.01) |
| *B60L 50/16* | (2019.01) |
| *B60K 6/48* | (2007.10) |
| *B60K 6/36* | (2007.10) |
| *B60W 30/19* | (2012.01) |
| *B60W 20/30* | (2016.01) |
| *B60W 10/08* | (2006.01) |

(52) U.S. Cl.
CPC .............. *B60K 6/547* (2013.01); *B60K 17/04* (2013.01); *B60L 50/16* (2019.02); *F16H 3/091* (2013.01); *F16H 3/54* (2013.01); *F16H 3/62* (2013.01); *F16H 3/72* (2013.01); *F16H 37/082* (2013.01); *B60K 6/36* (2013.01); *B60K 2006/4816* (2013.01); *B60W 10/08* (2013.01); *B60W 20/30* (2013.01); *B60W 30/19* (2013.01); *B60Y 2200/92* (2013.01); *F16H 2200/0008* (2013.01); *F16H 2200/0021* (2013.01); *F16H 2200/0034* (2013.01); *F16H 2200/2005* (2013.01); *F16H 2200/2035* (2013.01); *Y02T 10/6234* (2013.01); *Y02T 10/7077* (2013.01)

(58) Field of Classification Search
CPC ... B60K 2006/4816; B60K 6/36; B60L 50/16; F16H 3/72; F16H 3/091; Y02T 10/6234; B60Y 2200/92; B60W 10/08; B60W 20/30; B60W 30/19
USPC ................................................. 74/329; 475/5
See application file for complete search history.

(56) References Cited

U.S. PATENT DOCUMENTS

| | | | |
|---|---|---|---|
| 9,140,343 B1 | 9/2015 | Kim et al. | |
| 2002/0098940 A1 | 7/2002 | Minowa et al. | |
| 2002/0123407 A1 | 9/2002 | Hanyu et al. | |
| 2004/0144576 A1 | 7/2004 | Hashimoto | |
| 2012/0006153 A1 | 1/2012 | Imamura et al. | |
| 2012/0266704 A1 | 10/2012 | Sayama | |
| 2012/0277060 A1 | 11/2012 | Kubo et al. | |
| 2013/0276576 A1 | 10/2013 | Noguchi et al. | |
| 2014/0080666 A1 | 3/2014 | Ruhle et al. | |
| 2014/0374211 A1 | 12/2014 | Date | |
| 2015/0197244 A1* | 7/2015 | Kato | B60W 20/10 701/22 |
| 2016/0082951 A1 | 3/2016 | Ohn et al. | |
| 2017/0015298 A1* | 1/2017 | Imamura | B60L 3/0061 |
| 2017/0057489 A1* | 3/2017 | Schaefer | B60K 6/48 |
| 2019/0168601 A1* | 6/2019 | Ogino | B60L 50/16 |
| 2019/0270373 A1* | 9/2019 | Ogino | B60W 30/188 |

FOREIGN PATENT DOCUMENTS

| | | |
|---|---|---|
| DE | 102011102277 A1 | 11/2012 |
| DE | 102011089710 A1 | 6/2013 |
| EP | 2 289 751 | 3/2011 |
| EP | 2 821 270 A1 | 1/2015 |
| JP | 48-44648 A | 6/1973 |
| JP | 52-146686 A | 12/1977 |
| JP | H09-156388 | 6/1997 |
| JP | H09-193676 | 7/1997 |
| JP | 10-217779 A | 8/1998 |
| JP | 11-170877 A | 6/1999 |
| JP | 11-254982 A | 9/1999 |
| JP | 2000-289472 A | 10/2000 |
| JP | 2004-222435 A | 8/2004 |
| JP | 2006-54936 A | 2/2006 |
| JP | 2011-225202 A | 11/2011 |
| JP | 2012-197077 A | 10/2012 |
| JP | 2012-224219 A | 11/2012 |
| JP | 2013-154683 A | 8/2013 |
| JP | 2013-180680 A | 9/2013 |
| JP | 2013-224696 A | 10/2013 |
| JP | 2015-9648 A | 1/2015 |
| JP | 2016-68925 A | 5/2016 |
| JP | 2016-83962 A | 5/2016 |
| KR | 10-2002-0071699 | 9/2002 |
| KR | 10-2016-0035500 A | 3/2016 |
| WO | WO 2011/086828 A1 | 7/2011 |

OTHER PUBLICATIONS

International Search Report, issued in PCT/JP2017/012271, PCT/ISA/210, dated Jun. 20, 2017.
Written Opinion of the International Searching Authority, issued in PCT/JP2017/012271, PCT/ISA/237, dated Jun. 20, 2017.
Japanese Office Action for corresponding Japanese Application No. 2016-117005, dated Nov. 12, 2019, with English machine translation.
Korean Office Action for corresponding Korean Application No. 10-2018-7035764, dated Dec. 13, 2019, with English machine translation.
International Preliminary Report on Patentability and the English translation of the Written Opinion of the International Searching Authority (Fiorms PCT/IB/373, PCT/ISA/237) dated Jun. 20, 2017 for International Application No. PCT/JP2017/012272.
International Search Report, issued in PCT/JP2017/012272, PCT/ISA/210, dated Jun. 20, 2017.
Japanese Office Action of JP2016-117005 dated May 26, 2020.
Japanese Office Action of JP2016-117006 dated Nov. 12, 2019.
Korean Office Action of KR 10-2018-7035763 dated Dec. 13, 2019.
Supplementary European Search Report of EP17812971.4 dated Apr. 1, 2019.

* cited by examiner

TRANSAXLE DEVICE

TECHNICAL FIELD

The present invention relates to a transaxle device used in a hybrid vehicle including an engine and two rotating electric machines.

BACKGROUND ART

Conventionally, among hybrid vehicles including an engine and a rotating electric machine (a motor, a generator, and a motor generator), vehicles traveling while switching traveling modes are in practical use. A traveling mode includes an EV mode in which the vehicle travels only by a motor using charged power of a battery, a series mode in which the vehicle travels only by a motor while driving a generator to generate electric power by an engine, and a parallel mode in which the vehicle travels by using an engine and a motor together. The switching of the traveling mode is performed by controlling a mechanism such as a sleeve or a clutch interposed on a power transmission path inside a transaxle device. This mechanism is disposed on, for example, a shaft inside the power transmission path between the engine and the generator or a shaft inside the power transmission path between the engine and a drive wheel (see Patent Literatures 1 and 2).

PRIOR ART DOCUMENTS

Patent Documents

Patent Document 1: Japanese Laid-open Patent Publication No. 11-170877
Patent Document 2: Japanese Laid-open Patent Publication No. 2013-180680

SUMMARY OF INVENTION

Problem to be Solved by Invention

Incidentally, when it is possible to switch gears in response to a driver's request output or vehicle speed without switching the traveling mode, a traveling pattern increases and hence improvement of drivability or fuel economy is expected. In order to realize this, a plurality of switchable gears may be provided inside the transaxle device. However, since oil having a function of working oil or lubricating oil is stored in a casing of the transaxle device, a resistance due to oil may increase only when a mechanism of switching the plurality of gears is provided. For example, in a state in which the gears or the switching mechanism are immersed into oil (a so-called oil bath state), these mechanisms will stir the oil and the oil bath loss (oil resistance) may increase.

The object of the invention is to provide a transaxle device capable of increasing a traveling pattern while suppressing loss caused by oil bath. Furthermore, this object is not limited and another object of the invention is to exhibit operations and effects which are derived by each configuration illustrated in the embodiment for carrying out the invention to be described later and which is not obtainable by the conventional technique.

Means to Solve Problem (1) A transaxle device disclosed herein is a transaxle device for a hybrid vehicle including an engine, a first rotating electric machine, and a second rotating electric machine and operable to individually transmit power of the engine and power of the first rotating electric machine to an output shaft on a drive wheel side and also to transmit the power of the engine to the second rotating electric machine, the transaxle device including: an input shaft which is coaxially connected to a rotating shaft of the engine; and a switching mechanism which is interposed on at least the input shaft to switch a high gear stage and a low gear stage. Further, the first rotating electric machine means an electric power generator (a motor generator) or an electric motor which includes a rotating armature or field and has at least an electric motor function. Furthermore, the second rotating electric machine means an electric power generator (a motor generator) or an electric power generator which includes a rotating armature or field and has at least an electric power generator function.

(2) The transaxle device may further include: a counter shaft which is disposed on a power transmission path between the input shaft and the output shaft, wherein the switching mechanism may include two selection mechanisms which respectively select the high gear stage and the low gear stage, and wherein one of the two selection mechanisms may be interposed on the input shaft and the other thereof may be interposed at a position located on the counter shaft and overlapping the one selection mechanism in a direction orthogonal to an axial direction.

(3) The transaxle device may further include a differential gear which is interposed in the output shaft, wherein the high gear stage may be disposed on the opposite side to the differential gear with respect to the low gear stage inside a casing of the transaxle device.

(4) The switching mechanism may include an annular sleeve which is combined with the input shaft so as not to be relatively rotatable and to be slidable in the axial direction, and the sleeve may turn at least one idle gear of the high gear stage and the low gear stage into the rotational connection state with respect to the input shaft by moving in the axial direction.

(5) The transaxle device may further include: a second rotating electric machine shaft which is coaxially connected to a rotating shaft of the second rotating electric machine, wherein the input shaft may be connected to the second rotating electric machine shaft and a rotation speed of the input shaft may be adjusted to a rotation speed of the drive wheel by the second rotating electric machine when the sleeve moves.

(6) The sleeve may allow spline teeth formed on an inside in a radial direction to engage with dog teeth of the one idle gear to enter the rotational connection state.

(7) Alternatively, the switching mechanism may include a planetary gear which includes a sun gear, a carrier, and a ring gear, a clutch which is able to restrain two of the components of the planetary gear, and a brake which is able to restrain one of the components of the planetary gear.

(8) In this case, the brake may restrain the sun gear.

Advantageous Effects of Invention

It is possible to increase the traveling pattern by the switching mechanism for switching the high gear stage and the low gear stage. Further, since the switching mechanism is interposed in the input shaft, it is possible to prevent the switching mechanism from becoming an oil bath state. Thus, it is possible to increase the traveling pattern while suppressing loss caused by oil bath.

DESCRIPTION OF EMBODIMENTS

A transaxle device of an embodiment will be described with reference to the drawings. Each of the following embodiments is merely an example and there is no intention to exclude the application of various modifications and techniques not mentioned in the following embodiments. The configurations of the embodiments can be modified into various forms without departing from the gist thereof. Further, the configurations can be appropriately selected or combined as appropriate.

1. OVERALL CONFIGURATION

Figure 1:
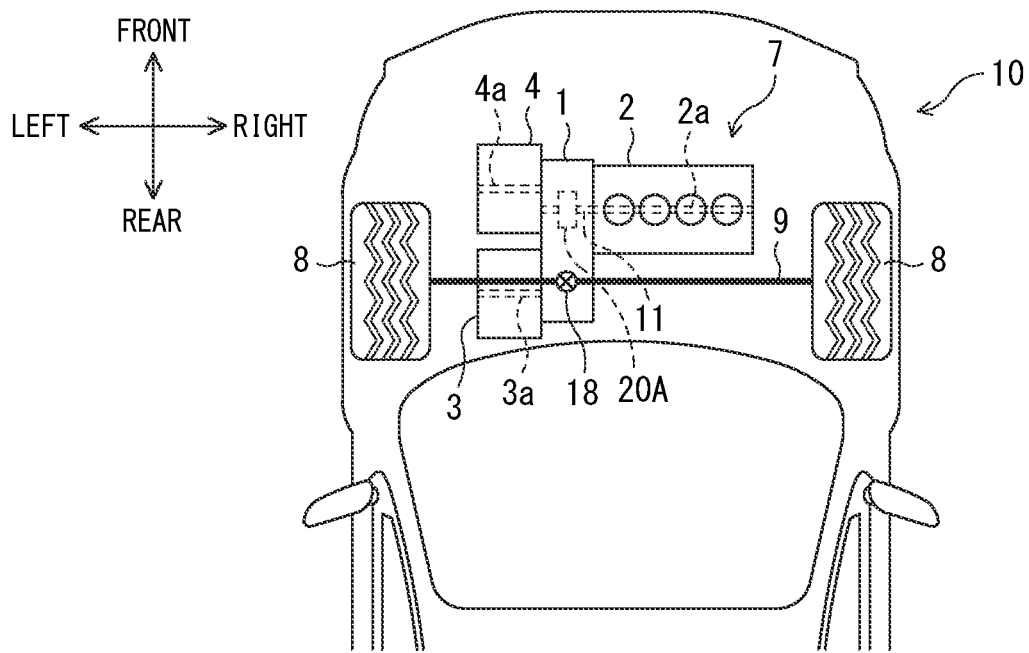
FIG. 1 is a top view illustrating an internal configuration of a vehicle including a transaxle device according to an embodiment.

A transaxle 1 (a transaxle device) of the embodiment is applied to a vehicle 10 illustrated in FIG. 1. The vehicle 10 is a hybrid vehicle which includes an engine 2, a traveling motor 3 (an electric motor, a first rotating electric machine), and an electric power generator 4 (an electric power generator, a second rotating electric machine). The generator 4 is connected to the engine 2 and is operable independently from the operation state of the motor 3. Further, the vehicle 10 is provided with three traveling modes including an EV mode, a series mode, and a parallel mode. These traveling modes are alternatively selected in response to a vehicle state, a travel state, or a driver's request output by an electronic control device (not illustrated) and hence the engine 2, the motor 3, and the generator 4 can be separately used in response to the type. It is to be noted that, the motor 3 may have a power generation function (a function of a generator) and the generator 4 may have an electric motor function (a function of a motor).

The EV mode is a traveling mode in which the vehicle 10 is driven only by the motor 3 using charged power of a driving battery (not illustrated) while the engine 2 and the generator 4 are stopped. The EV mode is selected in a case in which the traveling load and the traveling speed are low or the battery charge level is high. The series mode is a traveling mode in which the vehicle 10 is driven by the motor 3 using power while driving the generator 4 to generate electric power by the engine 2. The series mode is selected in a case in which the traveling load and the traveling speed are intermediate or the battery charge level is low. The parallel mode is a traveling mode in which the vehicle 10 is mainly driven by the engine 2 and the driving of the vehicle 10 is assisted by the motor 3 as appropriate and is selected in a case in which the traveling load and the traveling speed are high.

The engine 2 and the motor 3 are connected in parallel to a drive wheel 8 through the transaxle 1 and the power of each of the engine 2 and the motor 3 is individually transmitted thereto. Further, the generator 4 and the drive wheel 8 are connected in parallel to the engine 2 through the transaxle 1 and the power of the engine 2 is also transmitted to the generator 4 in addition to the drive wheel 8.

The transaxle 1 is a power transmission device which is obtained by integrating a final drive (a final speed reducer) including a differential gear 18 (a differential device, hereinafter referred to as the "differential 18") and a transmission (a speed reducer) and includes a plurality of mechanisms which are in charge of transmission of power between a drive source and a driven device. The transaxle 1 of the embodiment is configured to be switchable between a high/low state (a high speed stage and a low speed stage). When the vehicle travels in the parallel mode, a high gear stage and a low gear stage are switched in response to the travel state or the request output by the electronic control device.

The engine 2 is an internal combustion engine (a gasoline engine or a diesel engine) which burns gasoline or light oil. The engine 2 is a so-called transverse engine in which a direction of a crankshaft 2a (a rotating shaft) is disposed laterally to be aligned with a vehicle width direction of the vehicle 10 and is fixed to the right side surface of the transaxle 1. The crankshaft 2a is disposed in parallel to a drive shaft 9 of the drive wheel 8. The operation state of the engine 2 is controlled by the electronic control device.

Both the motor 3 and the generator 4 are an electric power generator (a motor generator) which has a function of an electric motor and a function of an electric power generator. The motor 3 mainly functions as an electric motor to drive the vehicle 10 and functions as an electric power generator at the time of regeneration. The generator 4 functions as an electric motor (a starter) at the time of starting the engine 2 and generates electric power by the power of the engine at the time of operating the engine 2. An inverter (not illustrated) which converts a DC current and an AC current is provided in the periphery (or the inside) of each of the motor 3 and the generator 4. The rotation speed of each of the motor 3 and the generator 4 is controlled by controlling the inverter. The operation state of each of the motor 3, the generator 4, and each inverter is controlled by the electronic control device.

The motor 3 of the embodiment is formed such that an outer shape is formed in a cylindrical shape using a rotating shaft 3a as a center axis and is fixed to the left side surface of the transaxle 1 in a posture in which a bottom surface thereof faces the transaxle 1. The generator 4 of the embodiment is formed such that an outer shape is formed in a cylindrical shape using a rotating shaft 4a as a center axis and is fixed to the left side surface of the transaxle 1 in a posture in which a bottom surface thereof faces the transaxle 1 similarly to the motor 3.

Figure 2:
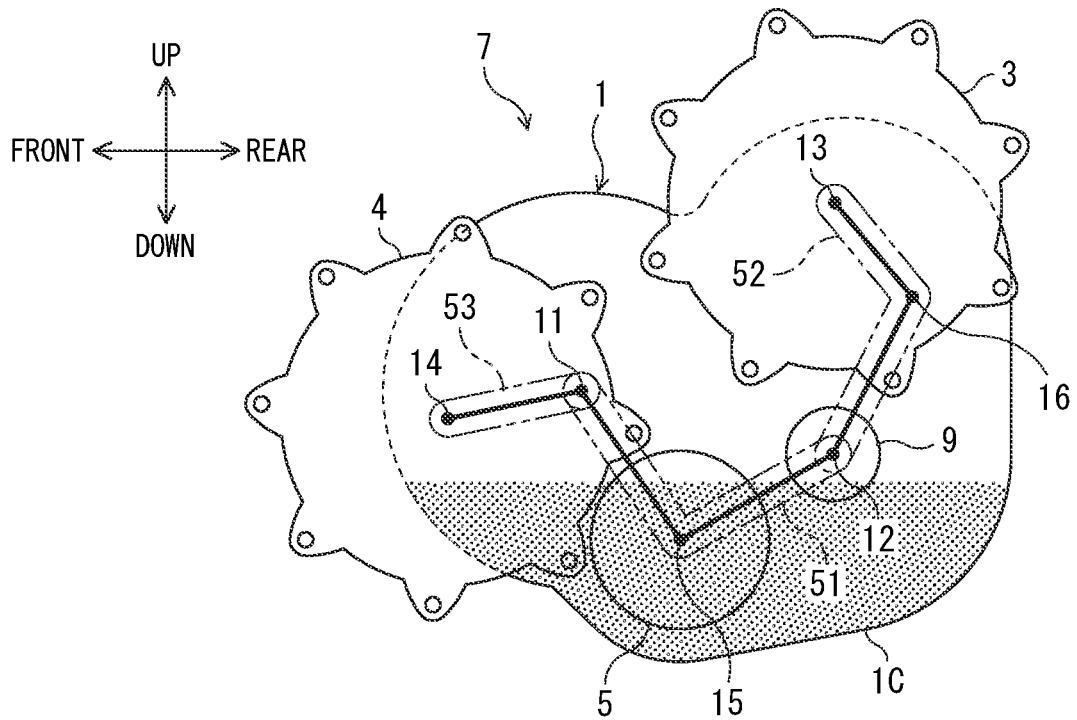
FIG. 2 is a schematic side view of a power train including the transaxle device of FIG. 1.

FIG. 2 is a side view when the engine 2, the motor 3, the generator 4, and a power train 7 including the transaxle 1 are viewed from the left side. The engine 2 is omitted in the side view. As illustrated in FIG. 2, a pump 5 is provided in the left side surface of the transaxle 1 in addition to the motor 3 and the generator 4. The pump 5 is a hydraulic pressure generation device which pressure-feeds oil functioning as working oil or lubricating oil to a hydraulic circuit (not illustrated) using power of the drive wheel 8.

The pump 5 of the embodiment is disposed at a relatively low position in the left side surface of the transaxle 1. In the example illustrated in FIG. 2, the pump 5 is disposed in the vicinity of a bottom portion of a casing 1C of the transaxle 1 at a position below the drive shaft 9. In a state in which at least the vehicle 10 is stopped, oil is collected up to an area around a dotted pattern in the drawing inside the casing 1C. The pump 5 is disposed so that a part thereof is located below the oil level of the oil. In the skeleton diagram after FIG. 3, the pump 5 and the transaxle 1 are illustrated in an integrated state (the pump 5 is built in the casing 1C).

2. TRANSAXLE

Figure 3:
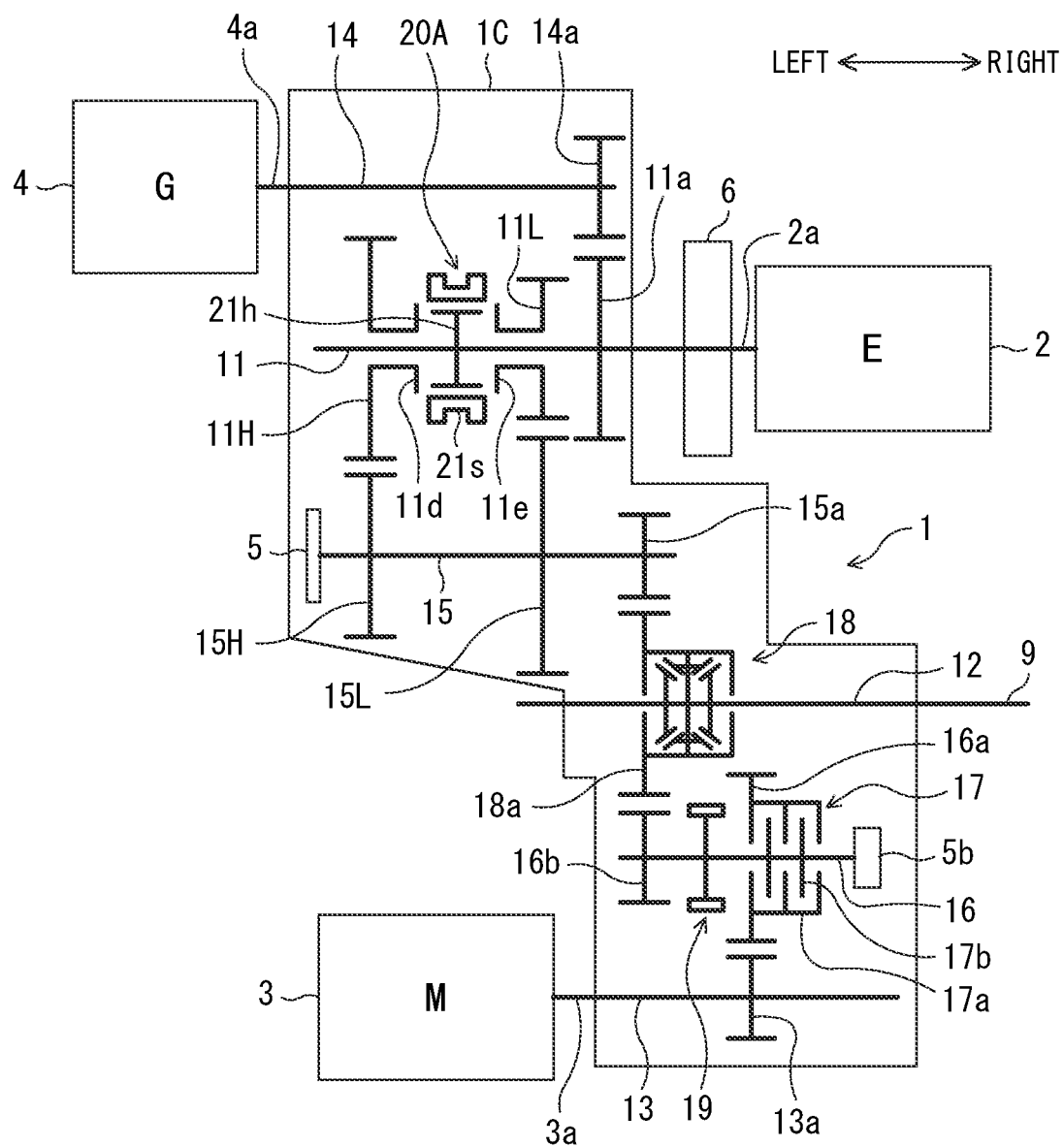
FIG. 3 is a skeleton diagram illustrating the power train of FIG. 2.

A skeleton diagram of the power train 7 including the transaxle 1 of the embodiment is illustrated in FIG. 3. As illustrated in FIGS. 2 and 3, the transaxle 1 is provided with six shafts 11 to 16 which are arranged in parallel. Hereinafter, a rotating shaft which is coaxially connected to the crankshaft 2a will be referred to as an input shaft 11. Similarly, rotating shafts which are coaxially connected to the drive shaft 9, the rotating shaft 3a of the motor 3, and the rotating shaft 4a of the generator 4 will be respectively referred to as an output shaft 12, a motor shaft 13 (a first rotating electric machine shaft), and a generator shaft 14 (a second rotating electric machine shaft). Further, a rotating shaft which is disposed on the power transmission path between the input shaft 11 and the output shaft 12 will be referred to as a first counter shaft 15 and a rotating shaft which is disposed on the power transmission path between the motor shaft 13 and the output shaft 12 will be referred to as a second counter shaft 16.

In all six shafts 11 to 16, both end portions are axially supported by the casing 1C through a bearing (not illustrated). Further, an opening (not illustrated) is formed in a side surface of the casing 1C located on each shaft of the input shaft 11, the output shaft 12, the motor shaft 13, and the generator shaft 14 and the shafts are connected to the crankshaft 2a and the like through these openings. Furthermore, the rotating shaft of the pump 5 is connected to the first counter shaft 15.

As illustrated in FIG. 2, the first counter shaft 15 is disposed at the lowest position (in the vicinity of the bottom portion of the casing 1C) in six shafts 11 to 16 and is immersed in oil collected inside the casing 1C (in an oil bath state) while at least the vehicle 10 is stopped. The shaft other than the first counter shaft 15 is located above the oil level of the oil while the vehicle 10 is stopped and is disposed not to easily immersed into the oil as compared with the first counter shaft 15 even when the oil level of the oil is changed from the state illustrated in FIG. 2 due to the vibration or the inclination of the vehicle 10 in a travel state.

Three power transmission paths are formed inside the transaxle 1. Specifically, a power transmission path (hereinafter, referred to as a "first path 51") extending from the input shaft 11 to the output shaft 12, a power transmission path (hereinafter, referred to as a "second path 52") extending from the motor shaft 13 to the output shaft 12, and a power transmission path (hereinafter, referred to as a "third path 53") extending from the input shaft 11 to the generator shaft 14 are formed as indicated by a two-dotted chain line in FIG. 2.

The first path 51 (the first mechanism) is a path which involves in the transmission of power from the engine 2 to the drive wheel 8 and is in charge of the transmission of power during the operation of the engine 2. A switching mechanism 20A to be described later is interposed in the course of the first path 51 to switch a power transmission enabled/disabled state and a high/low state. The second path 52 (the second mechanism) is a path which involves in the transmission of power from the motor 3 to the drive wheel 8 and is in charge of the transmission of power of the motor 3. A connection/disconnection mechanism to be described later is interposed in the course of the second path 52 to enable or disable the transmission of power. The third path 53 (the third mechanism) is a path which involves in the transmission of power from the engine 2 to the generator 4 and is in charge of the transmission of power at the time of starting the engine and generating electric power by the engine 2.

Next, a configuration of the transaxle 1 will be described in detail with reference to FIG. 3. In the following description, a "fixed gear" means a gear which is integrated with the shaft and is not rotatable with respect to the shaft. Further, an "idle gear" means a gear which is pivotally supported so as to be rotatable relative to the shaft.

One fixed gear 11a and two idle gears 11H and 11L are provided in the input shaft 11 and the switching mechanism 20A is interposed therein. The fixed gear 11a is disposed near (adjacent to) the right side surface of the casing 1C and normally engages with a fixed gear 14a provided in the generator shaft 14. That is, the input shaft 11 and the generator shaft 14 are connected to each other through two fixed gears 11a and 14a so that power can be transmitted between the engine 2 and the generator 4. Further, a torque limiter 6 having a function of protecting a power transmission mechanism by preventing excessive torque is interposed on the crankshaft 2a.

Two idle gears 11H and 11L having different number of teeth are normally engaged with two fixed gears 15H and 15L, respectively, provided in the first counter shaft 15 and having different number of teeth engage. In the embodiment, one idle gear 11L having a small number of teeth is disposed adjacent to the fixed gear 11a and the other idle gear 11H having a large number of teeth is disposed near the left side surface of the casing 1C (the opposite side to the differential 18 with respect to one idle gear 11L). One idle gear 11L having a small number of teeth engages with one fixed gear 15L having a large number of teeth to form a low gear stage. In contrast, the other idle gear 11H having a large number of teeth engages with the other fixed gear 15H having a small number of teeth to form a high gear stage.

That is, in the first counter shaft 15, the fixed gear 15L having a large diameter is disposed at a position close to the differential 18 and the fixed gear 15H having a small diameter is disposed at a position away from the differential 18. Since the first counter shaft 15 is adjacent to the output shaft 12 having the differential 18 interposed therein, for example, a portion along the first counter shaft 15 in the casing 1C can be decreased in diameter outward (a direction moving away from the differential 18) with the arrangement of these gears.

Alternatively, when the casing side surface provided with the opening of the output shaft 12 is provided between the fixed gear 15L having a large diameter and the fixed gear 15H having a small diameter, a portion along the first counter shaft 15 in the casing 1C can be decreased in size on the whole. With such a configuration, a space for connecting the drive shaft 9 is secured on the extension line of the output shaft 12 outside the casing 1C.

A left portion of the idle gear 11H is provided with a tooth surface portion which engages with the fixed gear 15H and a dog gear 11d is provided to be combined with a contact portion protruding from the right side of the tooth surface portion. A right portion of the idle gear 11L is provided with a tooth surface portion which engages with the fixed gear 15L and a dog gear 11e is provided to be combined with a contact portion protruding from the left side of the tooth surface portion. A front end portion of each of the dog gears 11d and 11e (an outer end portion in the radial direction) is provided with dog teeth (not illustrated).

The switching mechanism 20A is disposed between two idle gears 11H and 11L and is operable to control the power connection/disconnection state of the engine 2 and to switch the high gear stage and the low gear stage. The switching mechanism 20A of the embodiment includes a hub 21h which is fixed to the input shaft 11 and an annular sleeve 21s which is combined with the hub 21h (the input shaft 11) so as not to be relatively rotatable and to be slidable in the axial direction of the input shaft 11. An actuator (not illustrated) is controlled by the electronic control device and thus the sleeve 21s moves to both left and right sides from a neutral position in the drawing. Spline teeth (not illustrated) are formed at the inside of the sleeve 21s in the radial direction to engage with the dog teeth of the dog gears 11d and 11e. By the engagement of the spline teeth and the dog teeth, the sleeve 21s engages with the dog gear 11d or the dog gear 11e.

When the sleeve 21s is located at the neutral position, both two idle gears 11H and 11L are in an idle rotation state. In this case, even when the engine 2 is operated, the power of the engine 2 (the rotation of the input shaft 11) is not transmitted to the output shaft 12. That is, in this case, the transmission of the power of the engine 2 is interrupted. In this case, when the first counter shaft 15 rotates (that is, the drive wheel 8 rotates), two idle gears 11H and 11L rotate (idly rotate) following this rotation. Here, since the idle gears 11H and 11L are provided in the input shaft 11 and are not in an oil bath state, a friction generated by the rotation in accordance with the rotation of the first counter shaft 15 is small.

When the sleeve 21s moves to any one of the left and right sides from the neutral position so as to engage with one of the dog gears 11d and 11e of two idle gears 11H and 11L, the rotation of the input shaft 11 is transmitted to one of the idle gears 11H and 11L. Hereinafter, this state will be referred to as a rotatable connection state. In the transaxle 1 of the embodiment, the sleeve 21s turns the idle gear 11L of the low gear stage into the rotational connection state with respect to the input shaft 11 by moving to the right side so as to engage with the dog gear 11e of the idle gear 11L. In contrast, the sleeve 21s turns the idle gear 11H of the high gear stage into the rotational connection state with respect to the input shaft 11 by moving to the left side so as to engage with the dog gear 11d of the idle gear 11H.

Further, the transaxle 1 of the embodiment adjusts the rotation speed of the input shaft 11 to be synchronized with the rotation speed of the drive wheel 8 by the generator 4 when the sleeve 21s moves. That is, when the sleeve 21s engages with one of the dog gears 11d and 11e of the idle gears 11H and 11L (at the time of selecting the high gear stage or the low gear stage or switching the high gear stage and the low gear stage), the inverter of the generator 4 is controlled by the electronic control device so that the rotation speed of the input shaft 11 is adjusted to the rotation speed of the first counter shaft 15 before the engagement.

As the control method, for example, a method of detecting a rotation speed difference (a rotation difference) between the input shaft 11 and the drive wheel 8 by a sensor and applying a load to the rotation of the input shaft 11 from the generator 4 in response to the rotation speed difference in order to realize the synchronization can be exemplified. Alternatively, a method of detecting the rotation speed of the drive wheel 8 by a sensor and controlling the rotation speed of the generator 4 to be synchronized with that rotation speed can be exemplified.

In the first counter shaft 15, a fixed gear 15a is provided adjacent to the right side of the low side fixed gear 15L and the pump 5 is provided adjacent to the left side of the high side fixed gear 15H. Oil which is pressure-fed from the pump 5 is supplied into a hydraulic circuit including an oil path inlet (not illustrated) provided in the first counter shaft 15 and an oil path inlet 5b provided in the second counter shaft 16. The fixed gear 15a of the first counter shaft 15 normally engages with a ring gear 18a of the differential 18 provided in the output shaft 12. Further, the ring gear 18a of the differential 18 also normally engages with a fixed gear 16b provided near the left side surface of the casing 1C at a position on the second counter shaft 16.

The second counter shaft 16 is provided with a connection/disconnection mechanism which includes an idle gear 16a and a clutch 17 and a parking gear 19 which is disposed between the fixed gear 16b and the idle gear 16a. The idle gear 16a is fixed to one engagement component 17a of the clutch 17 and normally engages with a fixed gear 13a provided in the motor shaft 13 to rotate to follow the rotation of the motor shaft 13. The clutch 17 is a multiple disc type clutch which controls the power connection/disconnection state of the motor 3 and includes one engagement component 17a which is fixed to the idle gear 16a and the other engagement component 17b which is fixed to the second counter shaft 16. Further, the clutch 17 is disposed near the right side surface of the casing 1C.

The engagement component 17a is one to which power is input from the motor 3 and the engagement component 17b is one which outputs power to the drive wheel 8. These engagement components 17a and 17b are driven in a separating direction (a disengagement direction) and an approaching direction (an engagement direction) in response to the hydraulic pressure of the oil flowing from the oil path inlet 5b. When the clutch 17 is engaged, the power of the motor 3 is transmitted to the drive wheel 8 through the fixed gear 13a and the idle gear 16a and the rotation of the drive wheel 8 is transmitted to the motor 3. That is, when the clutch 17 is engaged, power running and regenerative power generation by the motor 3 becomes possible. In contrast, when the clutch 17 is disengaged while the vehicle travels by the engine 2 (the motor 3 is stopped), the idle gear 16a idly rotates and the rotation of the drive wheel 8 is not transmitted to the motor 3. Accordingly, the motor 3 is not rotated and the resistance is reduced.

It is to be noted that, a configuration may be employed in which a pressure regulator including a plurality of solenoid valves (an on/off solenoid valve, a linear solenoid valve, and the like) is provided on a hydraulic circuit and oil pressure-fed from the pump 5 is adjusted to an appropriate oil pressure so that the engagement/disengagement of the clutch 17 is controlled. Alternatively, an electronic controlling coupling may be provided instead of the pump 5 and the multiple disc type clutch 17 so that the transmission of power is enabled or disabled by the electronic control device.

The parking gear 19 is a component which constitutes a parking lock device and is fixed to the second counter shaft 16. When a P range is selected by a driver, the parking gear 19 engages with a parking sprag (not illustrated) to prohibit the rotation of the second counter shaft 16 (that is, the output shaft 12).

The differential 18 transmits the power transmitted to the ring gear 18*a* to the output shaft 12 through a differential casing, a pinion shaft, a differential pinion, and a side gear.

3. OPERATION AND EFFECT (1) The above-described transaxle 1 is provided with the switching mechanism 20A and the high gear stage and the low gear stage are switched in response to the travel state or the request output when the vehicle travels in the parallel mode. That is, since the power of the engine 2 can be transmitted (output) while being switched into two levels in the parallel mode, it is possible to increase the traveling pattern and to obtain the effect of improving the drivability and the fuel economy and improving the vehicle merchantability.

Further, in the above-described transaxle 1, since the shaft other than the first counter shaft 15 is disposed so as not to be easily immersed into oil and the switching mechanism 20A is interposed in the input shaft 11, it is possible to easily prevent the switching mechanism 20A from becoming an oil bath state. Accordingly, since it is possible to suppress loss caused by oil bath, it is possible to improve the transmission efficiency of the transaxle 1.

Further, in the above-described vehicle 10, since it is possible to individually output the power of the engine 2 and the motor 3, it is possible to cover the torque omission at the time of switching the high/low state by the power of the motor 3. Accordingly, since a transmission shock can be suppressed and the necessity of urgently performing the high/low state is lowered, it is possible to simplify the configuration of the switching mechanism 20A.

(2) In the above-described transaxle 1, the high gear stage (the idle gear 11H and the fixed gear 15H) is disposed on the opposite side to the differential 18 with respect to the low gear stage (the idle gear 11L and the fixed gear 15L) inside the casing 1C. That is, since a gear (the fixed gear 15L) having a large diameter is disposed at a position close to the differential 18 and a gear (the fixed gear 15H) having a small diameter is disposed at a position away from the differential 18 on the shaft (the first counter shaft 15) adjacent to the output shaft 12, a portion along the first counter shaft 15 in the casing 1C can be decreased in diameter or size on the whole, for example, in an outward direction (a direction moving away from the differential 18). Accordingly, it is possible to secure a space for connecting the drive shaft 9 on the extension line of the output shaft 12 outside the casing 1C while preventing an increase in size of the casing 1C.

(3) In the above-described transaxle 1, the switching mechanism 20A provided in the input shaft 11 includes the sleeve 21*s* and the idle gears 11H and 11L of at least one of the high gear stage and the low gear stage can enter the rotational connection state with respect to the input shaft 11 when the sleeve 21*s* moves in the axial direction. Since a gear ratio is not limited in the switching mechanism 20A using the sleeve 21*s*, the gear ratio of each of the high gear stage and the low gear stage can be freely set.

Further, in the above-described transaxle 1, any one of the idle gears 11H and 11L provided in the input shaft 11 enters the rotatable connection state, the other idle gear is rotated by the first counter shaft 15 of which torque is amplified. That is, as not in the above-described embodiment, when the idle gear is rotated by the input shaft 11 rotated by the power of the engine 2, the idle gear is rotated by the torque (power) before the amplification if the idle gear is partially in an oil bath state. As a result, a ratio of the consumption torque of the idle gear with respect to the torque (output torque) for driving the vehicle 10 increases. In contrast, as in the above-described embodiment, when the idle gears 11H and 11L are rotated by the first counter shaft 15, it is possible to suppress loss (a ratio of consumption torque) even when a part of the idle gears 11H and 11L are in an oil bath state.

(4) In the above-described transaxle 1, since the inverter of the generator 4 is controlled so that the rotation speed of the input shaft 11 is adjusted to the rotation speed of the drive wheel 8 when the sleeve 21*s* moves, the engagement between the sleeve 21*s* and one of the dog gears 11*d* and 11*e* of the idle gears 11H and 11L (that is, the selection of the high gear stage or the low gear stage or the switching of the high gear stage and the low gear stage) can be smoothly performed.

(5) Further, since the rotation is synchronized in this way by using the generator 4, it is possible to select the high gear stage or the low gear stage or switch the high gear stage and the low gear stage by engaging the dog teeth of the dog gears 11*d* and 11*e* with the spline teeth of the sleeve 21*s*. That is, since it is not possible to use an expensive synchronization mechanism, the switching mechanism 20A can have a simple configuration and can be manufactured at low cost.

4. MODIFIED EXAMPLES

The above-described transaxle 1 is an example and a configuration thereof is not limited to the above-described configuration. Hereinafter, modified examples of the transaxle 1 will be described with reference to FIGS. 4 to 12. FIGS. 4 to 12 are skeleton diagrams illustrating the power train 7 including the transaxle 1 according to first to ninth modified examples. In the components of the above-described embodiment or the modified examples, the same reference numerals as those of the above-described embodiment or the modified examples or the similar reference numerals (reference numerals having the same numbers and different alphabets) will be given to the components and a repetitive description thereof will be omitted.

Figure 4:
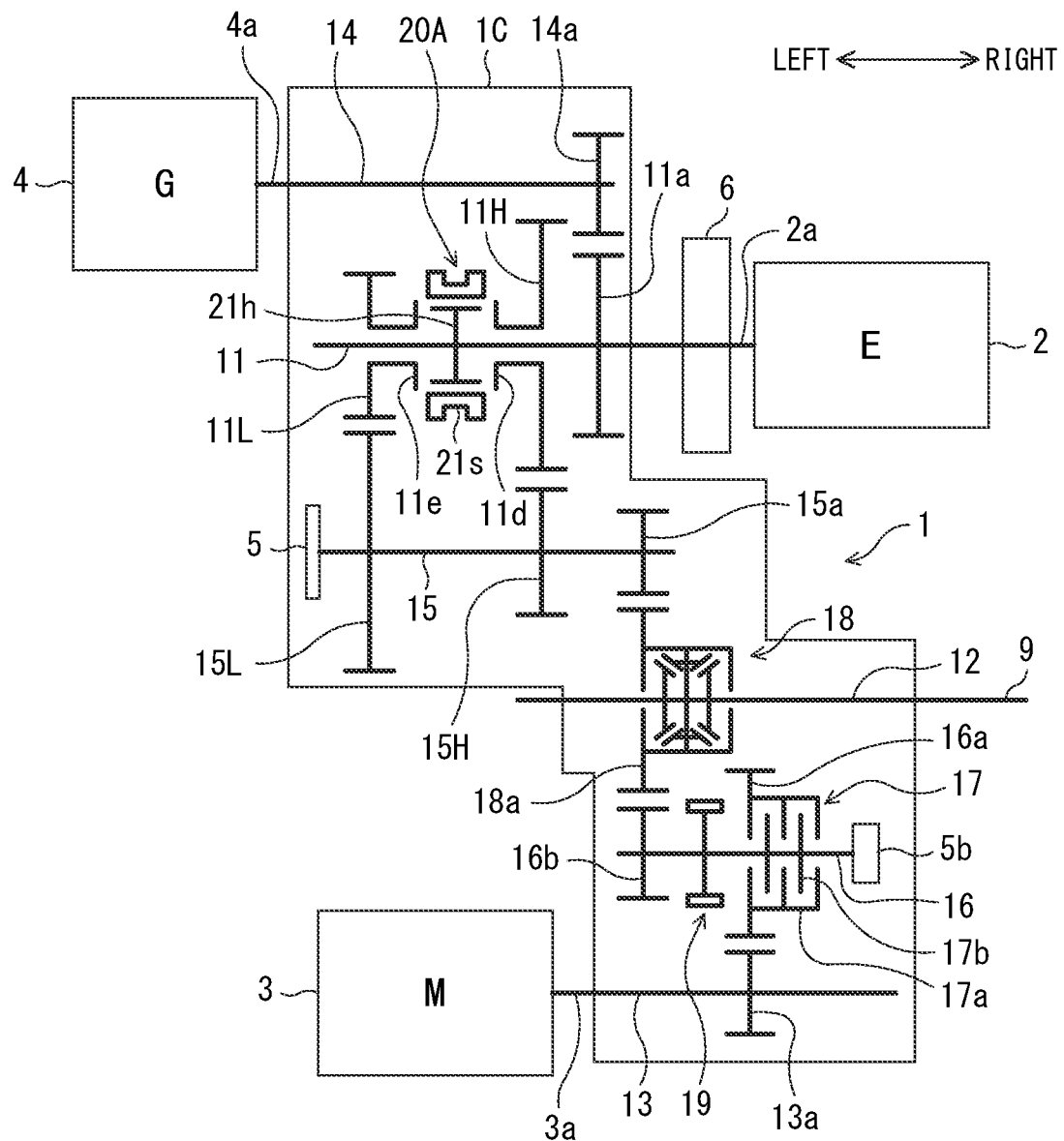
FIG. 4 is a skeleton diagram illustrating a power train according to a first modified example.
Figure 5:
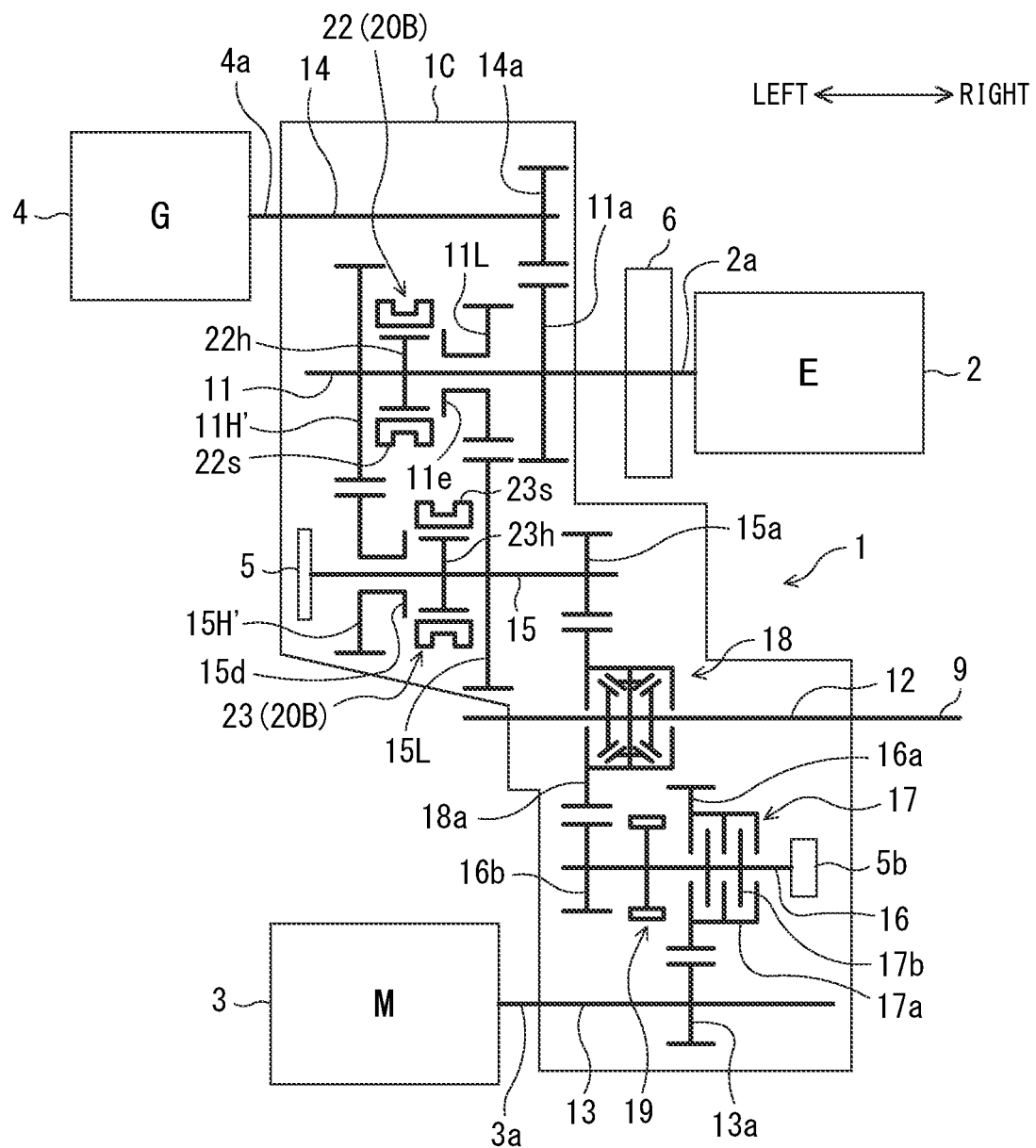
FIG. 5 is a skeleton diagram illustrating a power train according to a second modified example.
Figure 6:
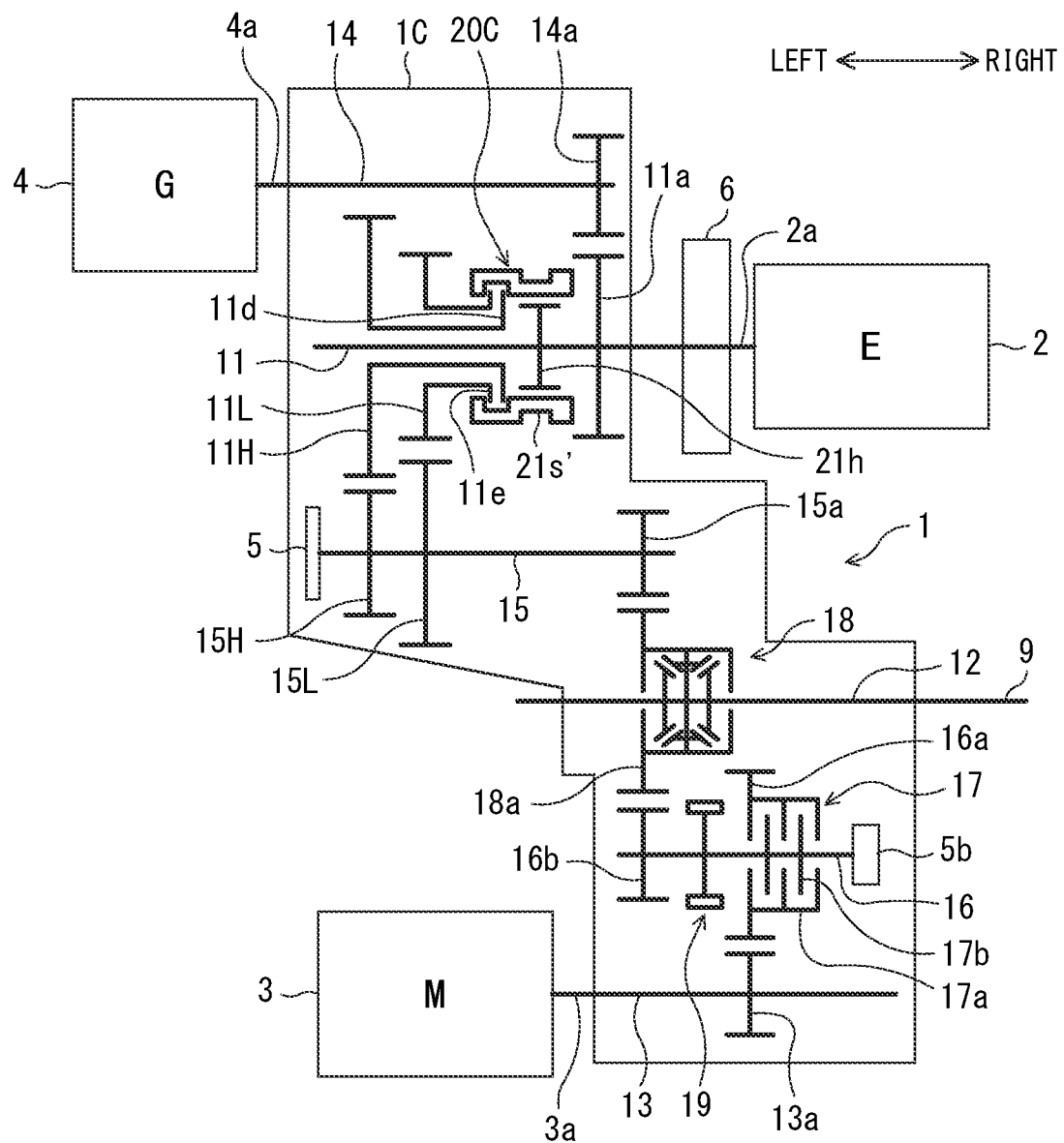
FIG. 6 is a skeleton diagram illustrating a power train according to a third modified example.

The transaxle 1 according to three modified examples illustrated in FIGS. 4 to 6 is provided with a switching mechanism including a sleeve similarly to the above-described embodiment. Meanwhile, the transaxle 1 according to six modified examples illustrated in FIGS. 7 to 12 includes a switching mechanism which includes a planetary gear, a clutch, and a brake. Similarly to the above-described switching mechanism 20A, the switching mechanism is interposed in at least the input shaft 11 and is operable to switch the high gear stage and the low gear stage. Hereinafter, the modified examples will be described.

4-1. First Modified Example

As illustrated in FIG. 4, the transaxle 1 according to the first modified example has the same configuration as that of the above-described embodiment except that the arrangement of the idle gear 11H and the fixed gear 15H forming the high gear stage and the idle gear 11L and the fixed gear 15L forming the low gear stage is different. That is, in the modified example, the low gear stage is disposed on the opposite side to the differential 18 with respect to the high gear stage. Also in such a configuration, an effect excluding (2) can be obtained.

4-2. Second Modified Example

As illustrated in FIG. 5, the transaxle 1 according to the second modified example has the same configuration as that of the above-described embodiment except that a switching mechanism 20B includes two selection mechanisms 22 and 23 respectively selecting the high gear stage and the low gear stage. One of two selection mechanisms 22 and 23 is interposed in the input shaft 11 and the other thereof is interposed in the first counter shaft 15. Further, these selection mechanisms 22 and 23 are disposed at an overlapping position in a direction orthogonal to the axial direction.

In the modified example, the selection mechanism 22 includes a hub 22h which is fixed to the input shaft 11 and an annular sleeve 22s which is combined with the hub 22h (the input shaft 11) so as not to be rotatable and to be slidable in the axial direction of the input shaft 11. Similarly, the selection mechanism 23 includes a hub 23h which is fixed to the first counter shaft 15 and an annular sleeve 23s which is combined with the hub 23h (the first counter shaft 15) so as not to be rotatable and to be slidable in the axial direction of the first counter shaft 15. These sleeves 22s and 23s also have spline teeth (not illustrated) at the inside in the radial direction.

Further, a fixed gear 11H' having a large number of teeth as compared with the above-described idle gear 11L is provided at the left side of the selection mechanism 22 in the input shaft 11 and an idle gear 15H' having a small number of teeth as compared with the above-described fixed gear 15L is provided at the left side of the selection mechanism 23 in the first counter shaft 15. The fixed gear 11H' and the idle gear 15H' normally engage with each other. Further, a left portion of the idle gear 15H' is provided with a tooth surface portion which engages with the fixed gear 11H' and a dog gear 15d is provided to be combined with a contact portion protruding from the right side of the tooth surface portion. Furthermore, a front end portion of the dog gear 15d is also provided with dog teeth (not illustrated).

When all of the sleeves 22s and 23s are located at neutral positions, both two idle gears 15H' and 11L are in an idle rotation state, so that the transmission of the power of the engine 2 is interrupted. When the sleeve 22s moves to the right side from the idle rotation state to engage with the dog gear 11e of the idle gear 11L while the sleeve 23s is located at the neutral position, the power of the engine 2 (the rotation of the input shaft 11) is transmitted to the output shaft 12 through the idle gear 11L and the fixed gear 15L. That is, in this case, the idle gear 11L of the low gear stage enters the rotational connection state with respect to the input shaft 11. Further, when the sleeve 23s moves to the left side from the idle rotation state to engage with the dog gear 15d of the idle gear 15H' while the sleeve 22s is located at the neutral position, the power of the engine 2 is transmitted to the output shaft 12 through the fixed gear 11H' and the idle gear 15H'. That is, in this case, the idle gear 15H' of the high gear stage enters the rotational connection state with respect to the first counter shaft 15.

Also in such a configuration, since one of two selection mechanisms 22 and 23 constituting the switching mechanism 20B is disposed in the input shaft 11, loss caused by oil bath can be suppressed. Further, according to the modified example, since the switching mechanism 20B includes two selection mechanisms 22 and 23 and these selection mechanisms 22 and 23 are disposed at an overlapping position in a direction orthogonal to the axial direction, it is possible to shorten the axial dimension (the entire length) of the transaxle 1 as compared with the transaxle 1 including the above-described switching mechanism 20A.

Further, since two selection mechanisms 22 and 23 are operated simultaneously to switch the high/low state, it is possible to shorten a time for switching the high/low state as compared with one switching mechanism 20A. That is, when two selection mechanisms 22 and 23 are provided, one of two idle gears 15H' and 11L is switched from the idle rotation state to the rotatable connection state and the other thereof is switched from the rotatable connection state to the idle rotation state. As a result, it is possible to promptly switch the high/low state.

4-3. Third Modified Example

As illustrated in FIG. 6, the transaxle 1 according to the third modified example has the same configuration as that of the above-described embodiment except that a switching mechanism 20C provided in the input shaft 11 and two idle gears 11H and 11L have a different positional relationship and a different shape. The switching mechanism 20C of the modified example is disposed between the fixed gear 11a and the low side idle gear 11L and two idle gears 11H and 11L are disposed adjacent to each other. That is, the high side idle gear 11H is disposed near the left side surface of the casing 1C in relation to the low side idle gear 11L.

The switching mechanism 20C includes a hub 21h which is fixed to the input shaft 11 and an annular sleeve 21s' which is combined with the hub 21h (the input shaft 11) so as not to be rotatable and to be slidable in the axial direction of the input shaft 11. The low side idle gear 11L is formed so that an inner diameter thereof is larger than that of the above-described embodiment, a left portion thereof is provided with a tooth surface portion engaging with the fixed gear 15L, and the dog gear 11e is provided to be combined with a contact portion protruding from the right side of the tooth surface portion. Meanwhile, the high side idle gear 11H is formed so that a left end thereof is provided with a tooth surface portion engaging with the fixed gear 15H, a right end thereof is provided with a contact portion combined with the dog gear 11d, and a cylindrical portion having a small outer diameter is formed therebetween (an intermediate portion). The cylindrical portion is a portion which penetrates the inside (the axis side) of the idle gear 11L. Accordingly, the dog gear 11d of the idle gear 11H is disposed at the right side of the dog gear 11e of the idle gear 11L.

A left portion of the sleeve 21s' is provided with spline teeth which engages with the dog teeth of each of the dog gears 11d and 11e of the idle gears 11H and 11L. When the sleeve 21s' is located at a neutral position of the drawing, both two idle gears 11H and 11L enter the idle rotation state, so that the transmission of the power of the engine 2 is interrupted. When the sleeve 21s' moves to the right side from the idle rotation state, the sleeve 21s' engages with the dog gear 11e of the idle gear 11L, so that the power of the engine 2 is transmitted to the output shaft 12 through the idle gear 11L and the fixed gear 15L. That is, in this case, the idle gear 11L of the low gear stage enters the rotational connection state with respect to the input shaft 11.

In contrast, when the sleeve 21s' moves to the left side from the idle rotation state, the sleeve 21s' engages with the dog gear 11d of the idle gear 11H, so that the power of the engine 2 is transmitted to the output shaft 12 through the idle gear 11H and the fixed gear 15H. That is, in this case, the idle gear 11H of the high gear stage enters the rotational connection state with respect to the input shaft 11.

Thus, also in the configuration of the transaxle 1 according to the modified example, the same effect as that of the above-described embodiment can be obtained.

4-4. Fourth Modified Example

Figure 7A:
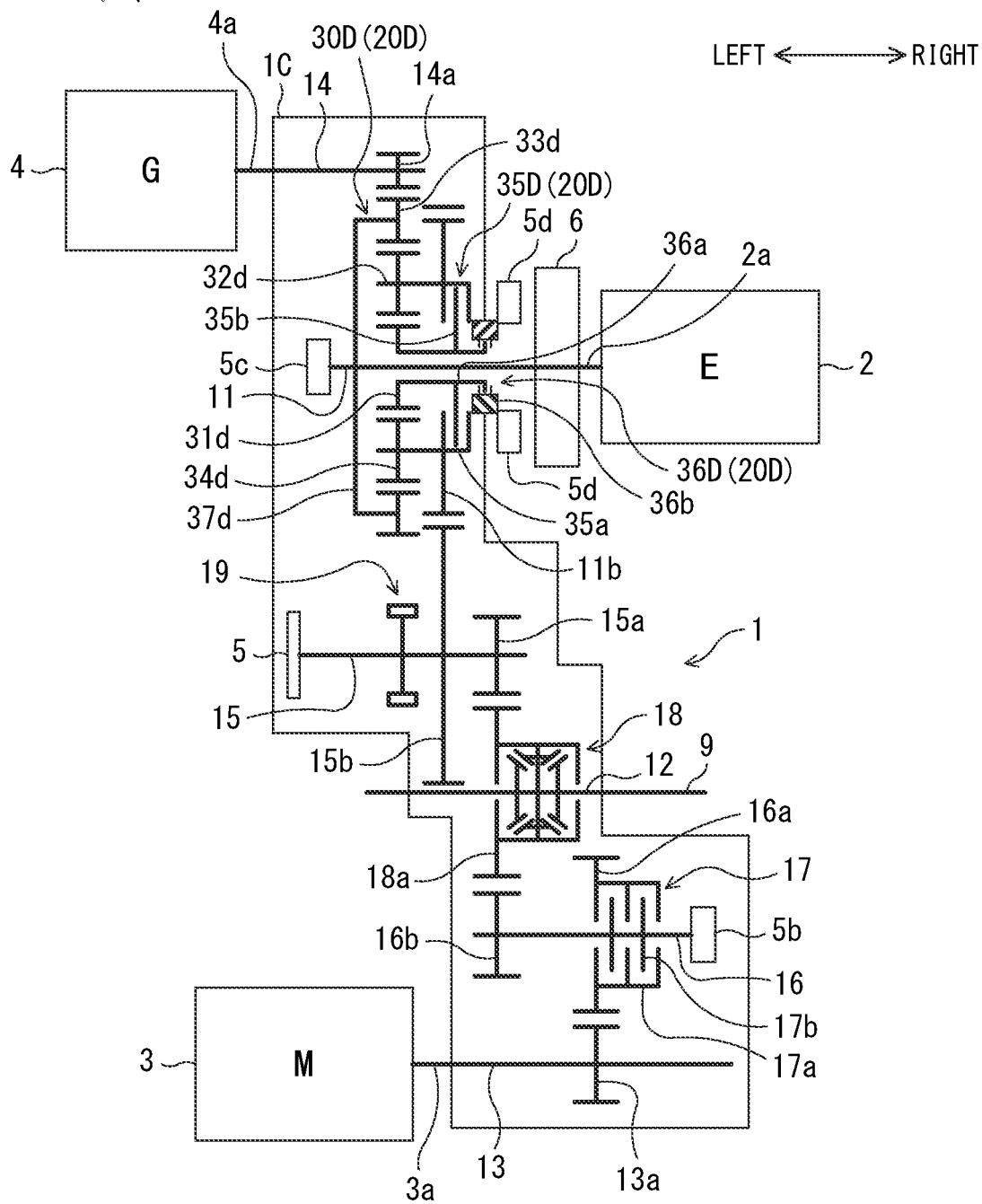
FIG. 7(a) is a skeleton diagram illustrating a power train according to a fourth modified example and FIG. 7(b) is an alignment chart.
Figure 7B:
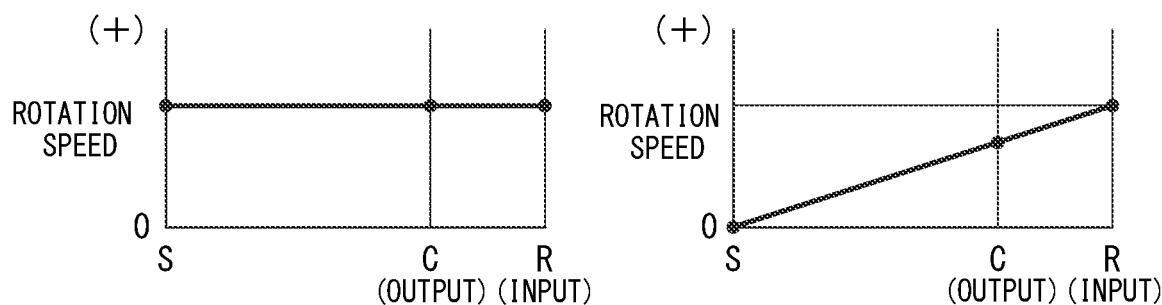

As illustrated in FIG. 7(a), the transaxle 1 according to the fourth modified example is provided with a switching mechanism 20D which includes a single pinion type planetary gear 30D, a clutch 35D operable to restrain two of the components of the planetary gear 30D, and a brake 36D operable to restrain one of the components of the planetary gear 30D. FIG. 7(b) is an alignment chart, a vertical axis in the drawing corresponds to a rotation speed (or a rotation speed ratio), and S, C, and R of a horizontal axis of the drawing respectively correspond to a sun gear, a carrier, and a ring gear.

The planetary gear 30D includes a sun gear 31d which is formed as an idle gear, a ring gear 33d which is connected to the input shaft 11 through a connection component 37d, a carrier 32d which is disposed between the sun gear 31d and the ring gear 33d, and a pinion gear 34d which is rotatably supported by the carrier 32d and normally engages with the sun gear 31d and the ring gear 33d. The clutch 35D is a multiple disc type clutch which controls the power connection/disconnection state of the engine 2 and the gears and includes two engagement components 35a and 35b. The brake 36D is a multiple disc type brake which controls gears together with the planetary gear 30D and the clutch 35D and includes two components 36a and 36b.

The ring gear 33d of the modified example includes an outer tooth which engages with the fixed gear 14a of the generator shaft 14 in addition to an inner tooth which engages with the pinion gear 34d. Since the ring gear 33d is fixed to the connection component 37d fixed to the input shaft 11, the power of the engine 2 is input to the ring gear 33d through the connection component 37d. One engagement component 35a of the clutch 35D is fixed to the carrier 32d. An idle gear 11b is fixed to the engagement component 35a, and the idle gear 11b normally engages with a fixed gear 15b provided in the first counter shaft 15. That is, the idle gear 11b rotates together with the carrier 32d and transmits the power of the engine 2 to the output shaft 12. The sun gear 31d is pivotally supported so as to be rotatable relative to the input shaft 11, a left portion thereof is provided with a tooth surface portion which engages with the pinion gear 34d, and the other engagement component 35b of the clutch 35D and a first component 36a of the brake 36D are fixed to a protruding portion protruding from the right side of the tooth surface portion.

The clutch 35D is driven in a separating direction (a disengagement direction) and an approaching direction (an engagement direction) of the engagement components 35a and 35b in response to the hydraulic pressure of the oil flowing from an oil path inlet 5c provided at the left end of the input shaft 11. That is, the clutch 35D releases or restrains the sun gear 31d and the carrier 32d among the components of the planetary gear 30D in response to the hydraulic pressure. Further, the brake 36D is disposed at the front end side of the protruding portion of the sun gear 31d and the second component 36b is fixed to the right side surface of the casing 1C. The brake 36D is driven in a separating direction (a disengagement direction) and an approaching direction (an engagement direction) of two components 36a and 36b in response to the hydraulic pressure of the oil flowing from an oil path inlet 5d provided at the right end of the input shaft 11 and restrains or releases the sun gear 31d.

In the transaxle 1 of the modified example, in a state in which the clutch 35D is engaged or the brake 36D restrains the sun gear 31d, the power input to the ring gear 33d is output from the carrier 32d and is transmitted to the first counter shaft 15 (the drive wheel 8) through the idle gear 11b and the fixed gear 15b. Meanwhile, when the clutch 35D is disengaged and the brake 36D releases the sun gear 31d, the power input to the ring gear 33d is not transmitted to the drive wheel 8. That is, in this case, the transmission of the power of the engine 2 is interrupted. The power of the engine 2 input to the ring gear 33d is also transmitted from the fixed gear 14a to the generator 4 regardless of the states of the clutch 35D and the brake 36D.

When the brake 36D is released while the clutch 35D is engaged, the sun gear 31d and the carrier 32d are restrained and rotated together. In this case, the alignment chart is illustrated at the left side of FIG. 7(b). Since the rotation speed is the same for all three components, the gear ratio becomes 1. Meanwhile, when the brake 36D restrains the sun gear 31d while the clutch 35D is disengaged, the rotation of the sun gear 31d is prohibited. In this case, the alignment chart is illustrated at the right side of FIG. 7(b) and the rotation speed of the carrier 32d (the output) becomes lower than the rotation speed of the ring gear 33d (the input).

That is, when the rotation of the sun gear 31d is prohibited, the rotation of the engine 2 is decreased (the torque is amplified) and is output from the carrier 32d and hence the gear ratio becomes larger than 1. In other words, in this case, in a state in which the sun gear 31d and the carrier 32d are restrained (a state of the gear ratio of 1), the low gear stage is established. It is to be noted that, as obvious from the alignment chart, since the rotation of the sun gear 31d is prohibited, the gear ratio of the low gear stage becomes a value close to the gear ratio of the high gear stage (the gear ratio of 1) as compared with a case in which the rotation of the carrier 32d or the ring gear 33d is prohibited.

As described above, in the transaxle 1 according to the modified example, the high gear stage (the gear ratio of 1) and the low gear stage can be switched by controlling the clutch 35D and the brake 36D of the switching mechanism 20D. Further, since it is possible to switch the high/low state by switching the engagement/disengagement state of the clutch 35D and the restraining/releasing state of the brake 36D, the control is easy as compared with the switching control of the sleeve 21s and the generation of sound at the time of the switching can be suppressed.

Incidentally, the parallel mode in which the vehicle travels by the power of the engine 2 is the traveling mode selected when the traveling load and the traveling speed are high. Accordingly, since the switching of gears at a high vehicle speed range is assumed at the time of designing the gear ratio of the high gear stage and the low gear stage in the parallel mode, the gear ratios need to be close to each other. In contrast, in the transaxle 1 according to the modified example, since the brake 36D restrains the sun gear 31d, the gear ratios of the high gear stage and the low gear stage can be made close to each other.

Also in the transaxle 1 according to the modified example, since the switching mechanism 20D is provided in the input shaft 11 similarly to the above-described embodiment, loss caused by oil bath can be suppressed.

4-5. Fifth Modified Example

Figure 8A:
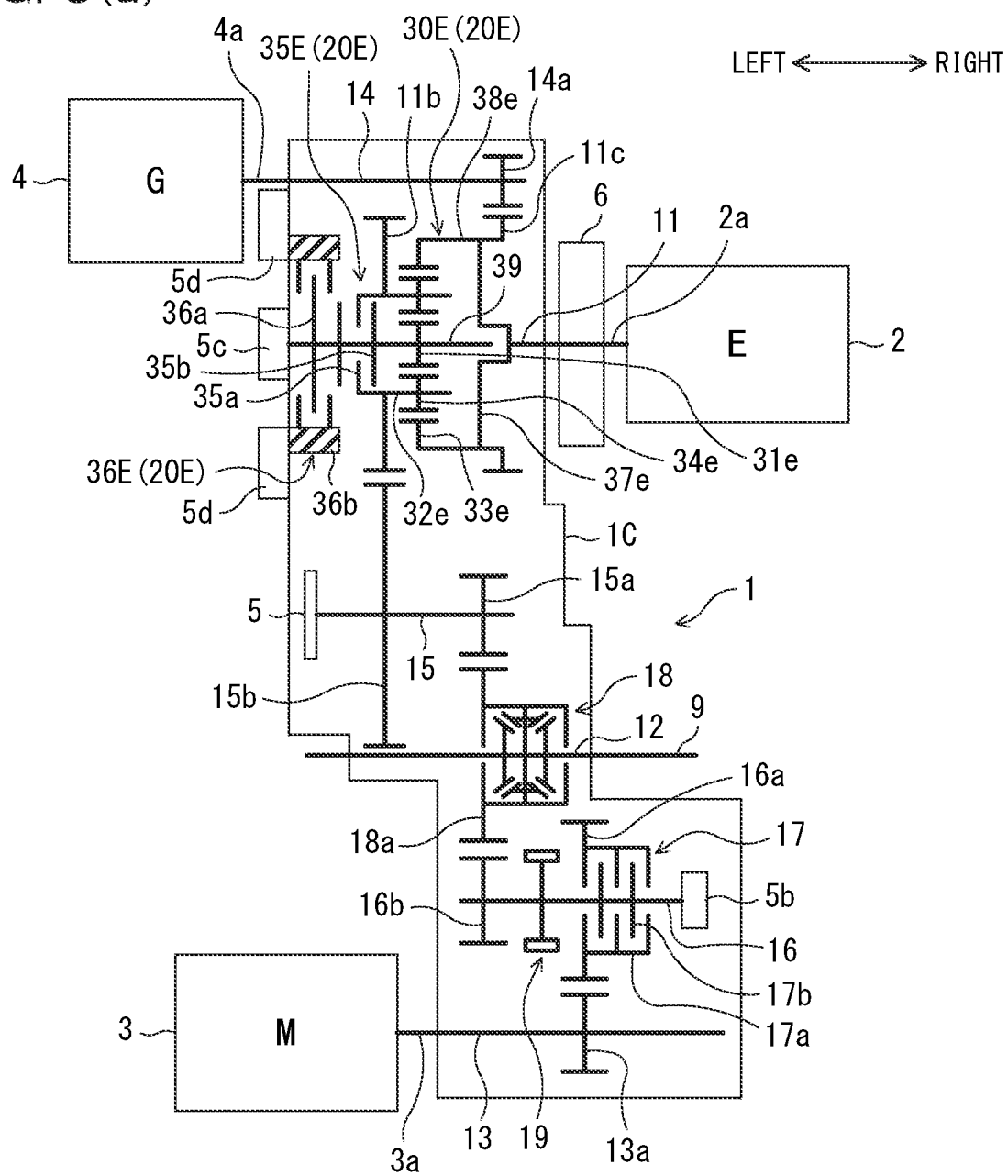
FIG. 8(a) is a skeleton diagram illustrating a power train according to a fifth modified example and FIG. 8(b) is an alignment chart.
Figure 8B:
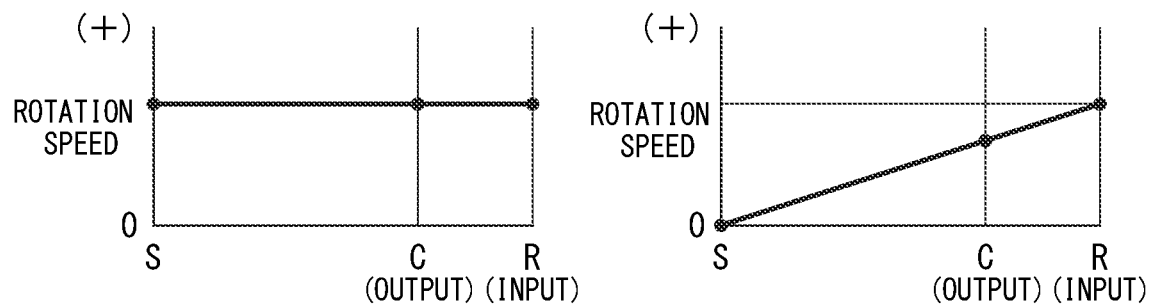

As illustrated in FIG. 8(a), the transaxle 1 according to the fifth modified example is provided with a switching mechanism 20E which includes a single pinion type planetary gear 30E, a clutch 35E operable to restrain two of the components of the planetary gear 30E, and a brake 36E operable to restrain one of the components of the planetary gear 30E. The transaxle 1 of the modified example is different from the fourth modified example in that the power transmission path from the input shaft 11 to the planetary gear 30E of the switching mechanism 20E is different and a configuration of the switching mechanism 20E is different.

The input shaft 11 of the modified example has a short axial length as compared with the input shaft 11 of the above-described embodiment and a left end thereof is fixed to a first connection component 37e. The first connection component 37e is fixed to the input shaft 11 at the center thereof and is fixed to a second connection component 38e at the outer end portion in the radial direction. The second connection component 38e is used to connect an idle gear 11c provided in the input shaft 11 to a ring gear 33e of the planetary gear 30E. The idle gear 11c normally engages with the fixed gear 14a of the generator shaft 14. Thus, the power of the engine 2 is transmitted from the input shaft 11 to the idle gear 11c (the generator 4) and the ring gear 33e through the first connection component 37e and the second connection component 38e.

A second shaft 39 which is coaxial to the input shaft 11 and is disposed to be separated from the input shaft 11 is provided at the left side of the input shaft 11. Both end portions of the second shaft 39 are axially supported by the casing 1C through a bearing (not illustrated). In the second shaft 39, a sun gear 31e of the planetary gear 30E is provided as a fixed gear and one engagement component 35b of the clutch 35E and the first component 36a of the brake 36E are fixed. Further, in a carrier 32e of the modified example, the other engagement component 35a of the clutch 35E is fixed and the above-described idle gear 11b is fixed.

The clutch 35E is driven in a separating direction (a disengagement direction) and an approaching direction (an engagement direction) of the engagement components 35a and 35b in response to the hydraulic pressure of the oil flowing from the oil path inlet 5c provided at the left end of the second shaft 39 and releases or restrains the sun gear 31e and the carrier 32e in response to the hydraulic pressure. Meanwhile, in the brake 36E, the first component 36a is fixed to the second shaft 39 and the second component 36b is fixed to the left side surface of the casing 1C. The brake 36E is driven in a separating direction (a disengagement direction) and an approaching direction (an engagement direction) of two components 36a and 36b in response to the hydraulic pressure of the oil flowing from the oil path inlet 5d and restrains or releases the sun gear 31e.

Thus, also in the transaxle 1 of the modified example, similarly to the fourth modified example, in a state in which the clutch 35E is engaged or the brake 36E restrains the sun gear 31e, the power input to the ring gear 33e is output from the carrier 32e and is transmitted to the first counter shaft 15 (the drive wheel 8) through the idle gear 11b and the fixed gear 15b. Meanwhile, when the clutch 35E is disengaged and the brake 36E releases the sun gear 31e, the transmission of the power of the engine 2 is interrupted. The power of the engine 2 input to the ring gear 33e is also transmitted from the fixed gear 14a to the generator 4 regardless of the states of the clutch 35E and the brake 36E.

When the brake 36E is released while the clutch 35E is engaged, the sun gear 31e and the carrier 32e are restrained and rotated together. In this case, the alignment chart is illustrated at the left side of FIG. 8(b). Further, when the brake 36E restrains the sun gear 31e while the clutch 35E is disengaged, the rotation of the sun gear 31e is prohibited. In this case, the alignment chart is illustrated at the right side of FIG. 8(b). As obvious from these alignment charts, also in the transaxle 1 according to the modified example, the high gear stage (the gear ratio of "1") and the low gear stage can be switched by controlling the clutch 35E and the brake 36E of the switching mechanism 20E similarly to the fourth modified example. In addition, the same effect as that of the fourth modified example can be obtained.

4-6. Sixth Modified Example

Figure 9A:
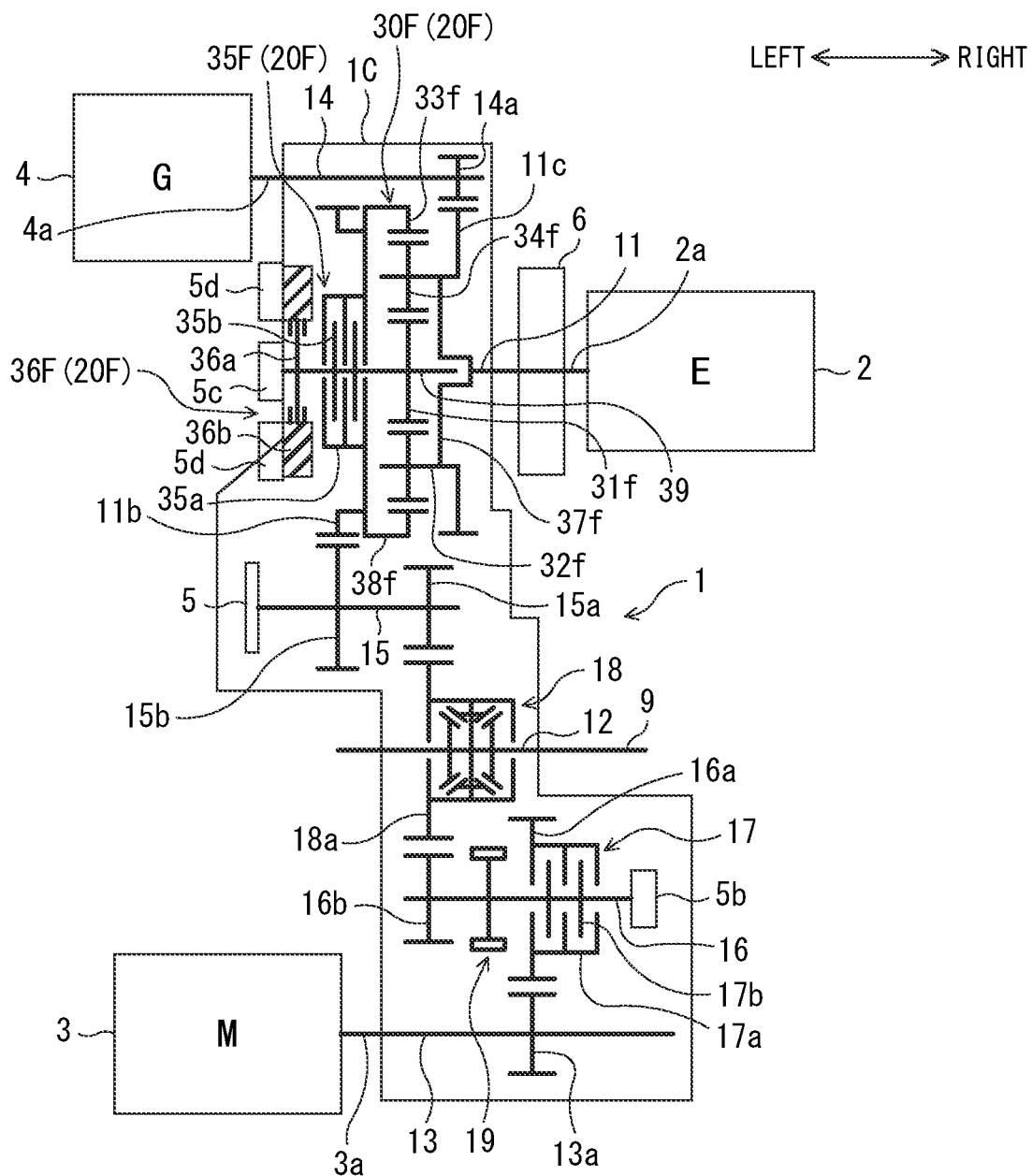
FIG. 9(a) is a skeleton diagram illustrating a power train of a sixth modified example and FIG. 9(b) is an alignment chart.
Figure 9B:
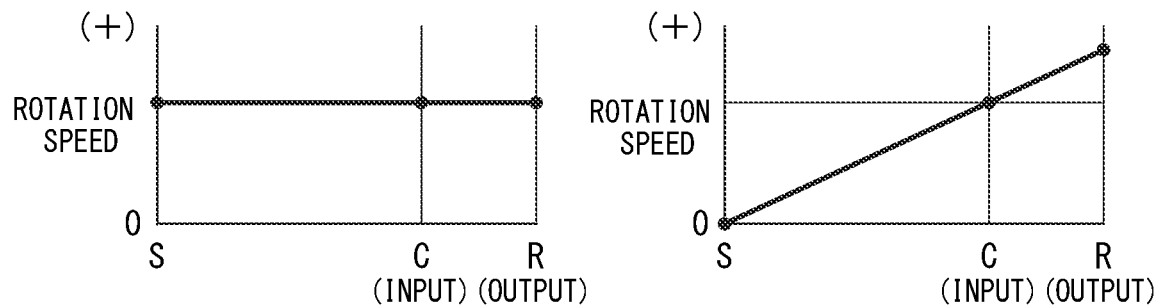

As illustrated in FIG. 9(a), the transaxle 1 according to the sixth modified example is provided with a switching mechanism 20F which includes a single pinion type planetary gear 30F, a clutch 35F operable to restrain two of the components of the planetary gear 30F, and a brake 36F operable to restrain one of the components of the planetary gear 30F. The transaxle 1 of the modified example is different from that of the fifth modified example in that the power input/output path for the planetary gear 30F is different and a configuration of the switching mechanism 20F is different.

Also in the input shaft 11 of the modified example, a left end thereof is fixed to the first connection component 37f similarly to the above-described fifth modified example. Here, the first connection component 37f is fixed to the carrier 32f at an outer end portion in the radial direction. Further, the idle gear 11c provided in the input shaft 11 is fixed to the carrier 32f. Furthermore, the idle gear 11c normally engages with the fixed gear 14a of the generator shaft 14. Thus, the power of the engine 2 is transmitted from the input shaft 11 to the carrier 32f through the first connection component 37f and is transmitted to the generator 4 through the idle gear 11c.

Also in the transaxle 1 of the modified example, the second shaft 39 is provided similarly to the fifth modified example. Further, in the second shaft 39, the sun gear 31f of the planetary gear 30F is provided as a fixed gear and one engagement component 35b of the clutch 35F and the first component 36a of the brake 36F are fixed. Furthermore, the idle gear 11b is connected to the ring gear 33f of the modified example through a second connection component 38f. Both the second connection component 38f and the idle gear 11b are provided to be rotatable with respect to the second shaft 39 and are rotated together with the ring gear 33f. The other engagement component 35a of the clutch 35F is fixed to the second connection component 38f.

Similarly to the fifth modified example, the clutch 35F is driven in a separating direction (a disengagement direction) and an approaching direction (an engagement direction) of the engagement components 35a and 35b in response to the hydraulic pressure of the oil flowing from the oil path inlet 5c and releases or restrains the sun gear 31f and the ring gear 33*f* in response to the hydraulic pressure. Further, in the brake 36F, similarly to the fifth modified example, the first component 36*a* is fixed to the second shaft 39 and the second component 36*b* is fixed to the left side surface of the casing 1C. The brake 36F is driven in a separating direction (a disengagement direction) and an approaching direction (an engagement direction) of two components 36*a* and 36*b* in response to the hydraulic pressure of the oil flowing from the oil path inlet 5*d* and restrains or releases the sun gear 31*f*.

In the transaxle 1 of the modified example, in a state in which the clutch 35F is engaged or the brake 36F restrains the sun gear 31*f*, the power input to the carrier 32*f* is output from the ring gear 33*f* and is transmitted to the first counter shaft 15 (the drive wheel 8) through the idle gear 11*b* and the fixed gear 15*b*. Meanwhile, when the clutch 35F is disengaged and the brake 36F releases the sun gear 31*f*, the transmission of the power of the engine 2 is interrupted. The power of the engine 2 input to the carrier 32*f* is also transmitted from the idle gear 11*c* to the generator 4 regardless of the states of the clutch 35F and the brake 36F.

When the brake 36F is released while the clutch 35F is engaged, the sun gear 31*f* and the ring gear 33*f* are restrained and rotated together. In this case, the alignment chart is illustrated at the left side of FIG. 9(*b*). Since the rotation speed is the same for all three components, the gear ratio becomes 1. Meanwhile, when the brake 36F restrains the sun gear 31*f* while the clutch 35F is disengaged, the rotation of the sun gear 31*f* is prohibited. In this case, the alignment chart is illustrated at the right side of FIG. 9(*b*) and the rotation speed of the ring gear 33*f* (the output) becomes higher than the rotation speed of the carrier 32*f* (the input).

That is, when the rotation of the sun gear 31*f* is prohibited, the rotation of the engine 2 is increased and output from the ring gear 33*f* and hence the gear ratio becomes smaller than 1. In other words, in this case, the high gear stage is established in a state in which the sun gear 31*f* and the ring gear 33*f* are restrained (a state of the gear ratio of "1"). As obvious from the alignment chart, since the rotation of the sun gear 31*f* is prohibited, the gear ratio of the high gear stage becomes close to the gear ratio of the low gear stage (the gear ratio of "1") as compared with a case in which the rotation of the carrier 32*f* or the ring gear 33*f* is prohibited.

Thus, also in the transaxle 1 of the modified example, since the high gear stage and the low gear stage (the gear ratio of "1") are switched similarly to the above-described fourth modified example, the control is easy and the generation of sound at the time of switching the high/low state can be suppressed. Further, since the brake 36F restrains the sun gear 31*f* similarly to the fourth modified example, the gear ratios of the high gear stage and the low gear stage can be made close to each other. Furthermore, also in the transaxle 1 according to the modified example, since the switching mechanism 20F is provided in the input shaft 11 similarly to the above-described embodiment, loss caused by oil bath can be suppressed.

4-7. Seventh Modified Example

Figure 10A:
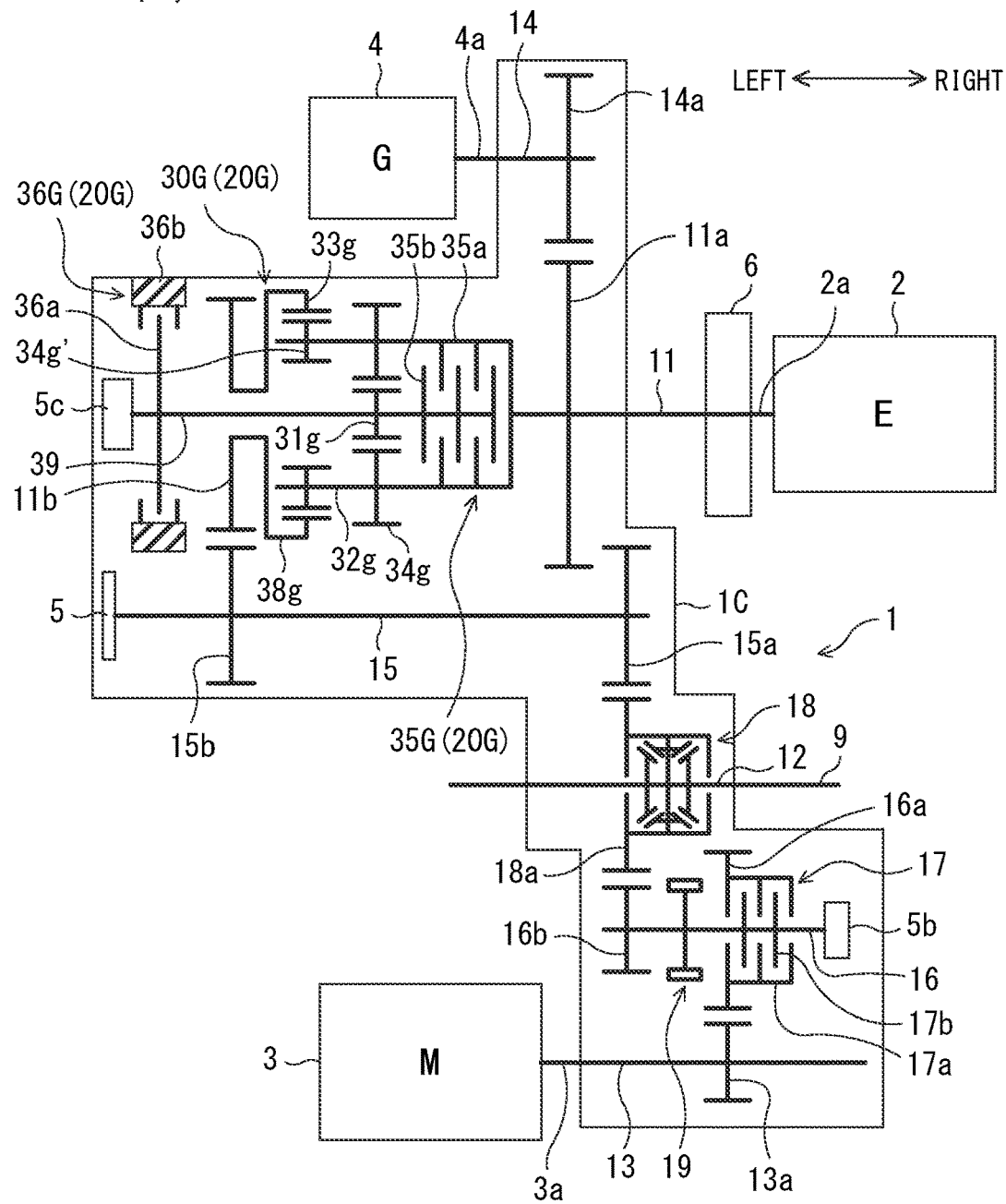
FIG. 10(a) is a skeleton diagram illustrating a power train according to a seventh modified example and FIG. 10(b) is an alignment chart.
Figure 10B:
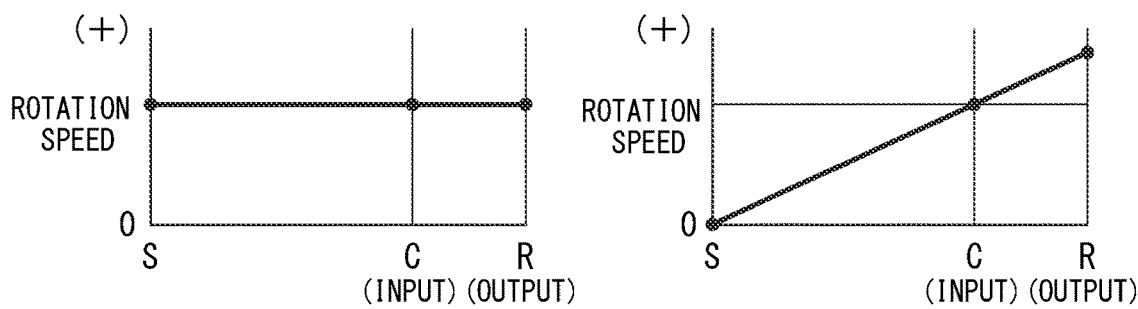

As illustrated in FIG. 10(*a*), the transaxle 1 according to the seventh modified example is provided with a switching mechanism 20G which includes a step pinion type planetary gear 30G, a clutch 35G operable to restrain two of the components of the planetary gear 30G, and a brake 36G operable to restrain one of the components of the planetary gear 30G. That is, the transaxle 1 of the modified example is different to those of the fourth to sixth modified examples in that the planetary gear 30G is of a step pinion type.

The transaxle 1 of the modified example is provided with the second shaft 39 similarly to the fifth modified example. The left end of the input shaft 11 is fixed to one engagement component 35*a* of the clutch 35G. The sun gear 31*g* is provided in the second shaft 39 as a fixed gear and the carrier 32*g* is fixed to the engagement component 35*a*. Further, two pinion gears 34*g* and 34*g*' having mutually different number of teeth are rotatably supported by the carrier 32*g*. One pinion gear 34*g* having a large number of teeth normally engages with the sun gear 31*g* and the other pinion gear 34*g*' having a small number of teeth normally engages with the ring gear 33*g*.

The ring gear 33*g* is connected to the idle gear 11*b* through the connection component 38*g*. All of the connection component 38*g* and the idle gear 11*b* are provided in the second shaft 39 to be relatively rotatable and are rotated together with the ring gear 33*g*. The idle gear 11*b* normally engages with the fixed gear 15*b* of the first counter shaft 15. That is, in the modified example, the power of the engine 2 is input to the carrier 32*g* and is output from the ring gear 33*g*.

In the second shaft 39, the other engagement component 35*b* of the clutch 35G is fixed to the right side of the sun gear 31*g* and the first component 36*a* of the brake 36G is fixed to the left side of the sun gear 31*g*. It is to be noted that, the second component 36*b* of the brake 36G is fixed to the casing 1C. Similarly to the fifth modified example, the clutch 35G is driven in a separating direction (a disengagement direction) and an approaching direction (an engagement direction) of the engagement components 35*a* and 35*b* in response to the hydraulic pressure of the oil flowing from the oil path inlet 5*c* and releases or restrains the sun gear 31*g* and the carrier 32*g* in response to the hydraulic pressure. Further, the brake 36G is driven in a separating direction (a disengagement direction) and an approaching direction (an engagement direction) of two components 36*a* and 36*b* in response to the hydraulic pressure of the oil flowing from the oil path inlet 5*c* and restrains or releases the sun gear 31*g*.

In the transaxle 1 of the modified example, when the clutch 35G is disengaged and the brake 36G releases the sun gear 31*g*, the transmission of the power of the engine 2 is interrupted. Meanwhile, when the brake 36G is released while the clutch 35G is engaged, the sun gear 31*g* and the carrier 32*g* are restrained and rotated together. For this reason, as illustrated in the alignment chart of the left side of FIG. 10(*b*), the gear ratio becomes 1. Meanwhile, when the brake 36G restrains the sun gear 31*g* while the clutch 36G is disengaged, the rotation of the sun gear 31*g* is prohibited. For this reason, as illustrated in the alignment chart of the right side of FIG. 10(*b*), the rotation speed of the ring gear 33*g* (the output) becomes higher than the rotation speed of the carrier 32*g* (the input). That is, in this case, since the rotation of the engine 2 is increased and output from the ring gear 33*g*, the gear ratio becomes smaller than 1 (the high gear stage).

Thus, also in the transaxle 1 of the modified example, the high gear stage and the low gear stage (the gear ratio of "1") can be switched similarly to the above-described embodiment. Further, the same effect can be obtained from the same configuration as those of the above-described embodiment and the fourth modified example.

4-8. Eighth Modified Example

Figure 11A:
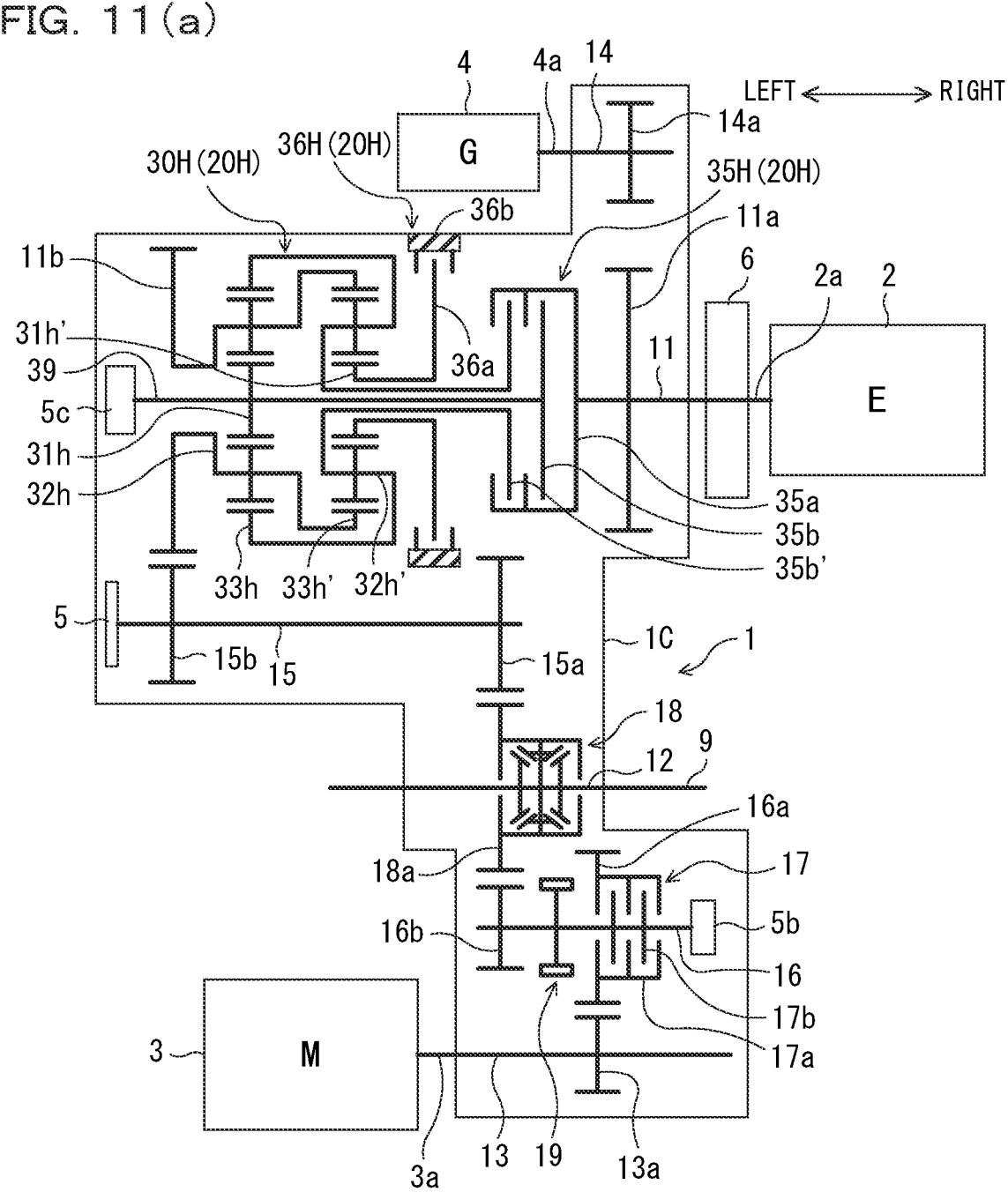
FIG. 11(a) is a skeleton diagram illustrating a power train according to an eighth modified example and FIG. 11(b) is an alignment chart.
Figure 11B:
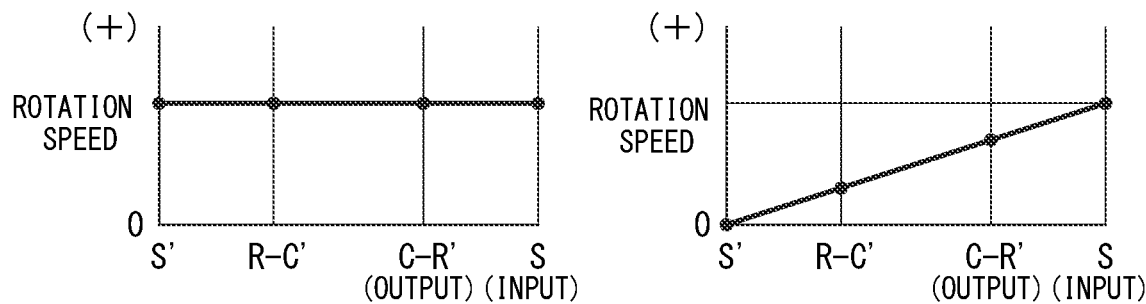

As illustrated in FIG. 11(*a*), the transaxle 1 according to the eighth modified example is provided with a switching mechanism 20H which includes a CR-CR type planetary gear 30H, a clutch 35H operable to restrain at least two of the components of the planetary gear 30H, and a brake 36H operable to restrain one of the components of the planetary gear 30H. Here, in the alignment chart illustrated in FIG. 11(b), dash (') is added to the component of the right-row planetary gear.

The transaxle 1 of the modified example is provided with the second shaft 39 similarly to the seventh modified example. The left end of the input shaft 11 is fixed to one engagement component 35a of the clutch 35H. Further, in the planetary gear 30H, the left-row carrier 32h and the right-row ring gear 33h' are connected and the left-row ring gear 33h and the right-row carrier 32h' are connected. The left-row carrier 32h is connected to the idle gear 11b normally engaging with the fixed gear 15b of the first counter shaft 15. That is, the power of the engine 2 is output from the left-row carrier 32h.

Further, a left-row sun gear 31h is provided in the second shaft 39 as a fixed gear and a right-row sun gear 31h' is provided in the second shaft 39 as an idle gear. The other engagement component 35b of the clutch 35H is fixed to the right end of the second shaft 39 and the engagement component 35b engages with the engagement component 35a fixed to the input shaft 11 so that the power of the engine 2 is input to the left-row sun gear 31h. Furthermore, the other engagement component 35b' of the clutch 35H is also fixed to the right-row carrier 32h'. Further, the first component 36a of the brake 36H is fixed to the right-row sun gear 31h'. Furthermore, the second component 36b of the brake 36H is fixed to the casing 1C.

The clutch 35H is driven in a separating direction (a disengagement direction) and an approaching direction (an engagement direction) of two engagement components 35b and 35b' in the engagement component 35a fixed to the input shaft 11 in response to the hydraulic pressure of the oil flowing from the oil path inlet 5c. When all of two engagement components 35b and 35b' are disengaged, the transmission of the power of the engine 2 is interrupted. Further, in a state in which the engagement components 35a and 35b engage with each other, the power of the engine 2 is transmitted to the left-row sun gear 31h.

When the engagement component 35b' engages with the engagement component 35a in addition to the engagement component 35b and the brake 36H is released, the left-row sun gear 31h, the left-row ring gear 33h (the right-row carrier 32h'), and the left-row carrier 32h (the right-row ring gear 33h') are restrained and rotated together. In this case, the alignment chart is illustrated at the left side of FIG. 11(b). Since the rotation speed is the same for all six components, the gear ratio becomes 1. Meanwhile, when only the engagement component 35b engages with the engagement component 35a and the brake 36H restrains the right-row sun gear 31h', the rotation of the sun gear 31h' is prohibited. In this case, the alignment chart is illustrated at the right side of FIG. 11(b) and the rotation speed of the left-row carrier 32h (the output) becomes lower than the rotation speed of the left-row sun gear 31h (the input).

That is, when the rotation of the sun gear 31h' is prohibited, the rotation of the engine 2 is decreased (the torque is amplified) and is output from the carrier 32h and hence the gear ratio becomes larger than 1 (the low gear stage). Thus, also in the transaxle 1 of the modified example, the high gear stage (the gear ratio of "1") and the low gear stage can be switched similarly to the above-described embodiment. Further, the same effect can be obtained from the same configuration as that of the above-described embodiment and the fourth modified example.

4-9. Ninth Modified Example

Figure 12A:
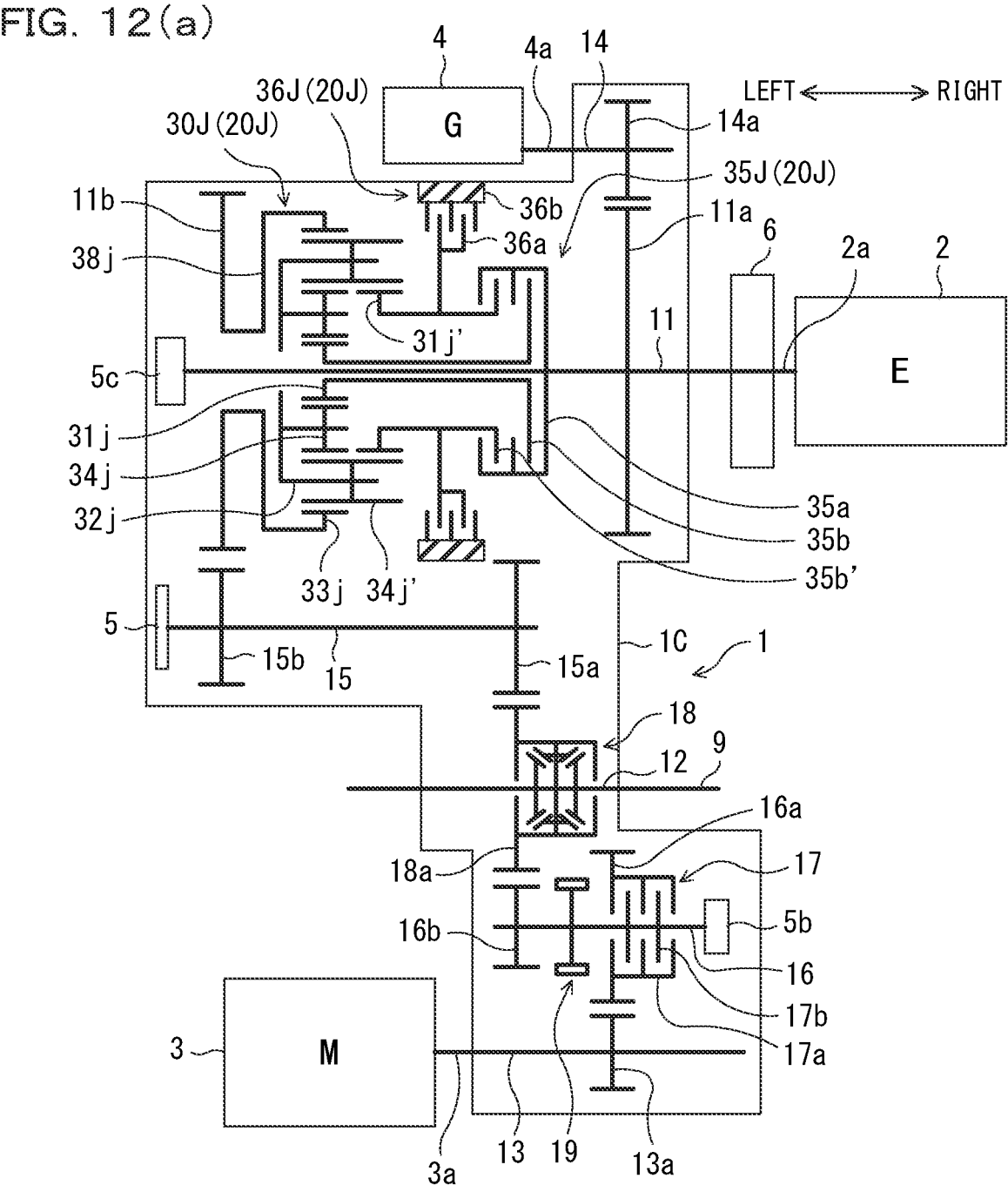
FIG. 12(a) is a skeleton diagram illustrating a power train according to a ninth modified example and FIG. 12(b) is an alignment chart.
Figure 12B:
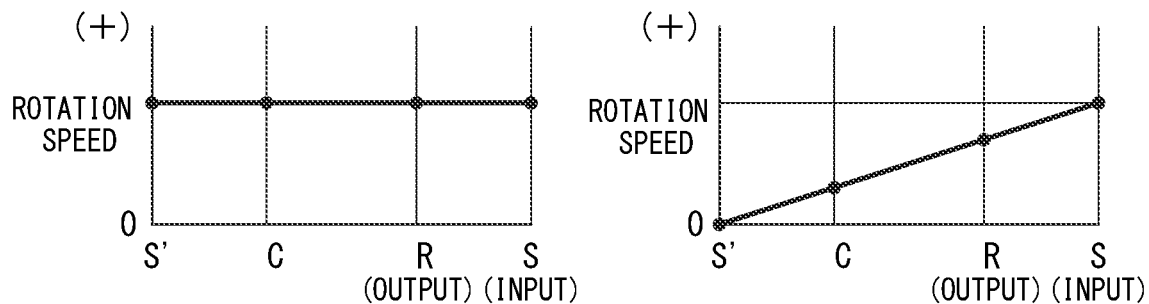

As illustrated in FIG. 12(a), the transaxle 1 according to the ninth modified example is provided with a switching mechanism 20J which includes a Ravigneaux type planetary gear 30J, a clutch 35J operable to restrain at least two of the components of the planetary gear 30J, and a brake 36J operable to restrain one of the components of the planetary gear 30J.

That is, the planetary gear 30J is obtained by a combination of a single pinion type planetary gear (right row) and a double pinion type planetary gear (left row) and a right-row pinion gear 34j' is provided as a long pinion normally engaging with a left-row pinion gear 34j. Further, a carrier 32j and a ring gear 33j are commonly used for two planetary gear trains. Furthermore, in the alignment chart illustrated in FIG. 12(b), a left-row sun gear 31j is indicated by "S" and a right-row sun gear 31j' is indicated by "S'".

In the transaxle 1 of the modified example, one engagement component 35a of the clutch 35J is fixed to the input shaft 11. In the planetary gear 30J, the ring gear 33j is connected to the idle gear 11b through the connection component 38j. Both the connection component 38j and the idle gear 11b are provided to be rotatable with respect to the input shaft 11 and are rotated together with the ring gear 33j. Furthermore, the idle gear 11b normally engages with the fixed gear 15b of the first counter shaft 15. That is, in the modified example, the power of the engine 2 is output from the ring gear 33j.

All of the left and right sun gears 31j and 31j' are provided in the input shaft 11 as the idle gears. Further, the other engagement components 35b and 35b' of the clutch 35J are respectively fixed to the left and right sun gears 31j and 31j'. Furthermore, the first component 36a of the brake 36J is fixed to the right-row sun gear 31j'. It is to be noted that, the second component 36b of the brake 36J is fixed to the casing 1C.

The clutch 35J is driven in a separating direction (a disengagement direction) and an approaching direction (an engagement direction) of two engagement components 35b and 35b' in the engagement component 35a fixed to the input shaft 11 in response to the hydraulic pressure of the oil flowing from the oil path inlet 5c. When all of two engagement components 35b and 35b' are disengaged, the transmission of the power of the engine 2 is interrupted. Further, in a state in which the engagement components 35a and 35b engage with each other, the power of the engine 2 is transmitted to the left-row sun gear 31j. That is, in the modified example, the power of the engine 2 is input to the left-row sun gear 31j.

When the engagement components 35b and 35b' engage with the engagement component 35a and the brake 36J is released, the left and right sun gears 31j and 31j' are restrained and rotated together. In this case, the alignment chart is illustrated at the left side of FIG. 12(b). Since the rotation speed is the same all four components, the gear ratio becomes 1. Meanwhile, when only the engagement component 35b engages with the engagement component 35a and the brake 36J restrains the right-row sun gear 31j', the rotation of the sun gear 31j' is prohibited. In this case, the alignment chart is illustrated at the right side of FIG. 12(b) and the rotation speed of the ring gear 33j (the output) becomes lower than the rotation speed of the left-row sun gear 31j (the input).

That is, when the rotation of the sun gear 31j' is prohibited, the rotation of the engine 2 is decreased (the torque is amplified) and is output from the ring gear 33j and hence the gear ratio becomes larger than 1 (the low gear stage). Thus, also in the transaxle 1 of the modified example, the high gear stage (the gear ratio of "1") and the low gear stage can be switched similarly to the above-described embodiment. Further, the same effect can be obtained from the same configuration as those of the above-described embodiment and the fourth modified example.

5. OTHERS

While the embodiment and the modified examples of the invention have been described, the invention is not limited to the above-described embodiment and the like and can be modified into various forms without departing from the gist of the invention. For example, a multiple disc type clutch may be provided as the switching mechanism for switching the high gear stage and the low gear stage instead of the sleeve 21*s* and the like. Further, when the switching mechanism includes the planetary gear, the clutch, and the brake, the high gear stage and the low gear stage may be switched in such a manner that the component other than the sun gear is restrained by the brake and two components are restrained by the clutch.

Further, the relative positions of the engine 2, the motor 3, the generator 4, and the pump 5 with respect to the transaxle 1 are not limited to the above-described positions. The arrangement of six shafts 11 to 16 inside the transaxle 1 may be set in response to the relative positions. Furthermore, the arrangement of the gears provided in the shafts inside the transaxle 1 is also exemplary and is not limited to the above-described example. The clutch 17 which is interposed in the course of the second path 52 involving in the transmission of power from the motor 3 to the drive wheel 8 may be omitted.

REFERENCE SIGNS LIST

1 TRANSAXLE (TRANSAXLE DEVICE)
1C CASING
2 ENGINE
2*a* CRANKSHAFT (ROTATING SHAFT)
3 MOTOR (ELECTRIC MOTOR, FIRST ROTATING ELECTRIC MACHINE)
4 GENERATOR (ELECTRIC POWER GENERATOR, SECOND ROTATING ELECTRIC MACHINE)
8 DRIVE WHEEL
10 VEHICLE
11 INPUT SHAFT
12 OUTPUT SHAFT
14 GENERATOR SHAFT (SECOND ROTATING ELECTRIC MACHINE SHAFT)
15 FIRST COUNTER SHAFT (COUNTER SHAFT)
18 DIFFERENTIAL (DIFFERENTIAL GEAR)
20A, 20B, 20C, 20D, 20E, 20F, 20G, 20H, 20J SWITCHING MECHANISM
21*s*, 21*s'*, 22*s*, 23*s* SLEEVE
22, 23 SELECTION MECHANISM
30D, 30E, 30F, 30G, 30H, 30J PLANETARY GEAR
31*d*, 31*e*, 31*f*, 31*g*, 31*h*, 31*h'*, 31*j*, 31*j'* SUN GEAR
32*d*, 32*e*, 32*f*, 32*g*, 32*h*, 32*h'*, 32*j* CARRIER
33*d*, 33*e*, 33*f*, 33*g*, 33*h*, 33*h'*, 33*j* RING GEAR
35D, 35E, 35F, 35G, 35H, 35J CLUTCH
36D, 36E, 36F, 36G, 36H, 36J BRAKE

The invention claimed is:

1. A transaxle device for a hybrid vehicle including an engine, a first rotating electric machine, and a second rotating electric machine and operable to individually transmit power of the engine and power of the first rotating electric machine to an output shaft on a drive wheel side and also to transmit the power of the engine to the second rotating electric machine, the transaxle device comprising:
   an input shaft which is coaxially connected to a rotating shaft of the engine;
   a first fixed gear coaxially provided on the input shaft;
   a second rotating electric machine shaft coaxially connected to an output shaft of the second rotating electric machine;
   a second fixed gear coaxially provided on the second rotating electric machine shaft and in constant engagement with the first fixed gear;
   a counter shaft disposed on a power transmission path between the input shaft and the output shaft;
   a third idle gear coaxially provided on the counter shaft and in constant engagement with a first idle gear, and a fourth idle gear coaxially provided on the countershaft and in constant engagement with a second idle gear; and
   a switching mechanism interposed on at least the input shaft to switch a high gear stage and a low gear stage, wherein
   the switching mechanism includes,
      a first dog gear connected to the first idle gear of one of the high gear stage and the low gear stage,
      a second dog gear connected to the second idle gear of the other of the high gear stage and the low gear stage,
      a hub coaxially provided on the input shaft and between the first dog gear and the second dog gear, and
      an annular sleeve prevented from a relative rotation with respect to the hub, and slidable in an axial direction of the input shaft to selectively engage with one of the first dog gear and the second dog gear so that the first idle gear is in a rotatable connection state with input shaft when the annular sleeve is in engagement with the first dog gear and the second idle gear is in the rotatable connection state when the annular sleeve is in engagement with the second dog gear, and
   wherein, when the vehicle is in a stopped state, the input shaft and the second rotating electric machine shaft are above an oil level of oil collected inside a casing of the transaxle device and the counter shaft is below the oil level.

2. The transaxle device according to claim 1, further comprising:
   a differential gear which is interposed on the output shaft, wherein the high gear stage is disposed on an opposite side to the differential gear with respect to the low gear stage inside a casing of the transaxle device.

3. The transaxle device according to claim 1, wherein the input shaft is connected to the second rotating electric machine shaft and a rotation speed of the input shaft is adjusted to a rotation speed of the drive wheel by the second rotating electric machine when the sleeve moves.

4. The transaxle device according to claim 2, wherein the input shaft is connected to the second rotating electric machine shaft and a rotation speed of the input shaft is adjusted to a rotation speed of the drive wheel by the second rotating electric machine when the sleeve moves.

5. The transaxle device according to claim 3,
wherein the sleeve allows spline teeth formed on an inside in a radial direction to engage with dog teeth of the one idle gear to enter the rotational connection state.

6. The transaxle device according to claim 4,
wherein the sleeve allows spline teeth formed on an inside in a radial direction to engage with dog teeth of the one idle gear to enter the rotational connection state.

\* \* \* \* \*